United States Patent [19]
Yamasaki et al.

[11] Patent Number: 5,365,303
[45] Date of Patent: Nov. 15, 1994

[54] SHAKE-FREE IMAGE RESTORATION SYSTEM

[75] Inventors: Masafumi Yamasaki; Yoshinori Matsuzawa, both of Tokyo, Japan

[73] Assignee: Olympus Optical Co., Ltd., Tokyo, Japan

[21] Appl. No.: 62,292

[22] Filed: May 14, 1993

[30] Foreign Application Priority Data

| May 21, 1992 | [JP] | Japan | 4-129105 |
| Jul. 13, 1992 | [JP] | Japan | 4-185010 |
| Aug. 11, 1992 | [JP] | Japan | 4-214131 |
| Oct. 5, 1992 | [JP] | Japan | 4-266344 |

[51] Int. Cl.$^5$ .................. G03B 17/00; G03B 17/24
[52] U.S. Cl. .................. 354/430; 354/106
[58] Field of Search ............... 354/105, 106, 70, 410, 354/430, 202; 358/222, 102, 105, 345; 359/554; 348/96, 107, 142, 208

[56] References Cited

U.S. PATENT DOCUMENTS

| 4,612,575 | 9/1986 | Ishman et al. | 358/105 X |
| 4,862,277 | 8/1989 | Iwaibana et al. | 358/222 |
| 4,989,077 | 1/1991 | Yamamoto et al. | 358/102 X |
| 5,130,729 | 7/1992 | Sato et al. | 354/202 |
| 5,153,633 | 10/1992 | Otani | 354/430 |
| 5,155,520 | 10/1992 | Nagasaki et al. | 354/430 |
| 5,229,810 | 7/1993 | Cloutier et al. | 354/106 X |

FOREIGN PATENT DOCUMENTS

| 62-127976 | 6/1987 | Japan . |
| 63-187883 | 8/1988 | Japan . |
| 3-159482 | 7/1991 | Japan . |
| 5-72592 | 3/1993 | Japan . |

OTHER PUBLICATIONS

Youichi Miyake: A Recommendable Way for Image Processing Shashin Kogyo, pp. 109-113; Jun., 1987.

*Primary Examiner*—W. B. Perkey
*Attorney, Agent, or Firm*—Frishauf, Holtz, Goodman & Woodward

[57] ABSTRACT

An image pick-up device shoots a scene by exposing a film by way of an optical system and recording an image of the scene on the film. A shake quantity detecting unit detects a shake quantity of the image pick-up device during the exposure of the film to the scene by the device and a shake data recording unit records data representing the shake quantity on a recording medium on the film. A shake data reproducing unit reproduces the data representing the shake quantity recorded on the recording medium. A shake trace data transformation unit outputs shake transmitting functions generated on the basis of the data representing the shake quantity. A first Fourier transformation unit carries out a Fourier transformation on the shake transmitting functions. Image transformation unit transforms the image of the scene recorded on the film into digital signals. A second Fourier transformation unit carries out a Fourier transformation on the digital signal. A dividing unit carries out divisions on outputs from the first and second Fourier transformation units. An inverse Fourier transformation unit carries out an inverse Fourier transformation on an output from the dividing unit, an output from the inverse Fourier transformation unit being an image of the scene free from any trace of the shake.

34 Claims, 17 Drawing Sheets

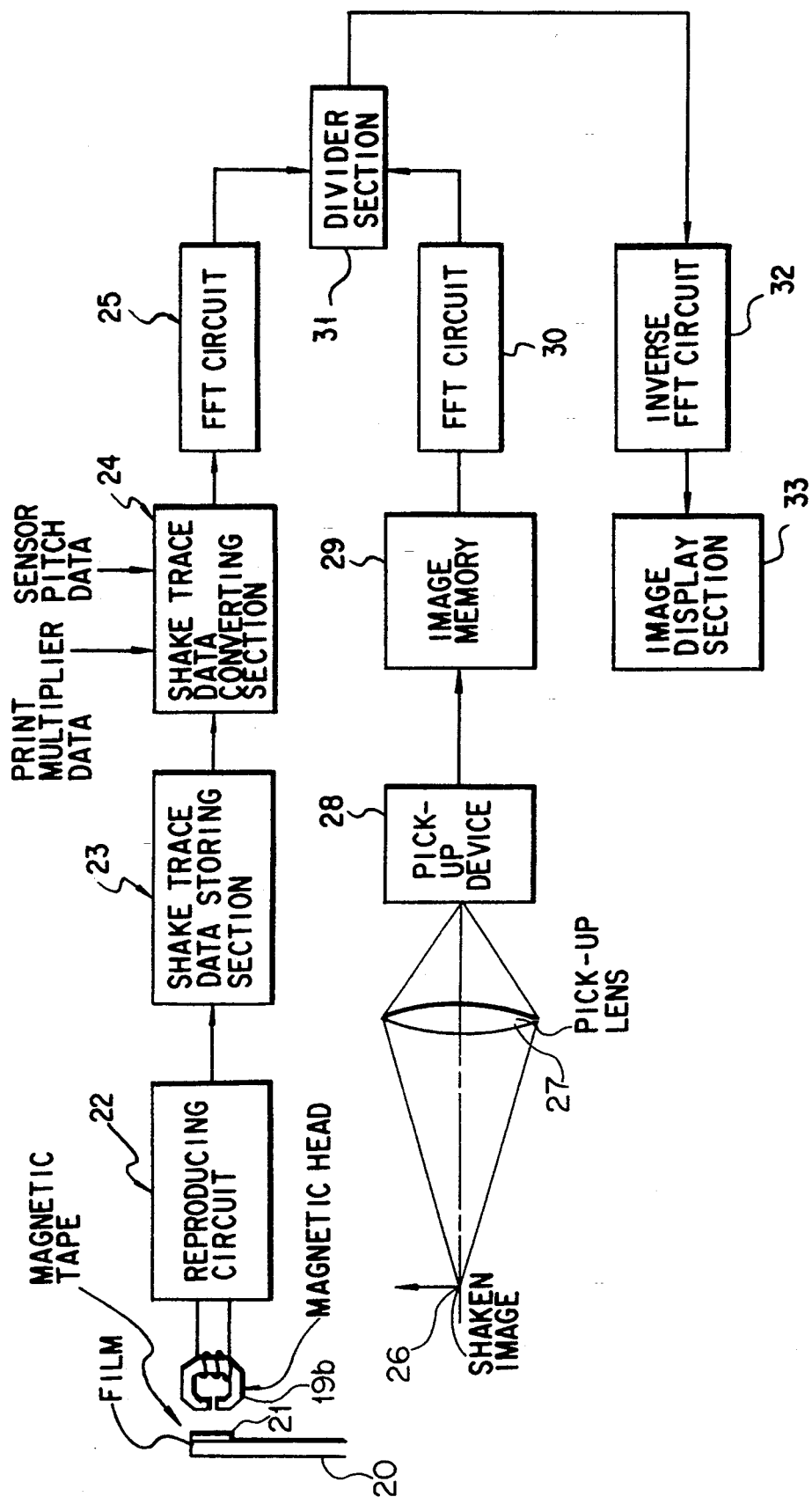
F I G. 1

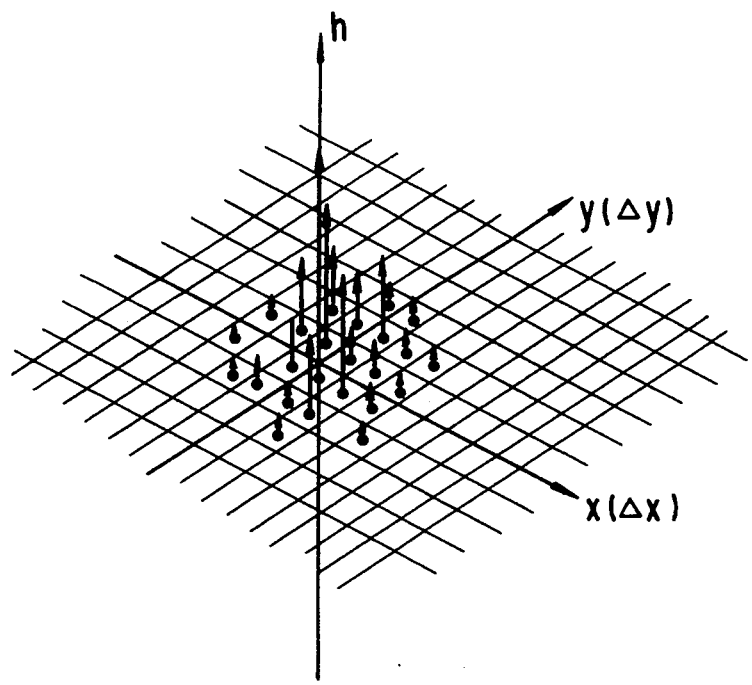
F I G. 2
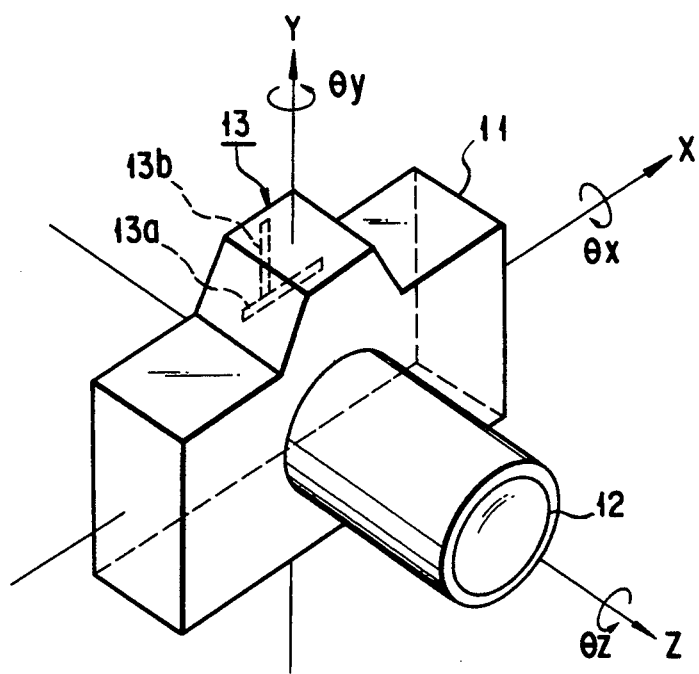
F I G. 3

| $h_0$ | $h_1$ | $h_2$ |
|---|---|---|
| $h_3$ | $h_4$ | $h_5$ |
| $h_6$ | $h_7$ | $h_8$ |

F I G. 7

F I G. 8

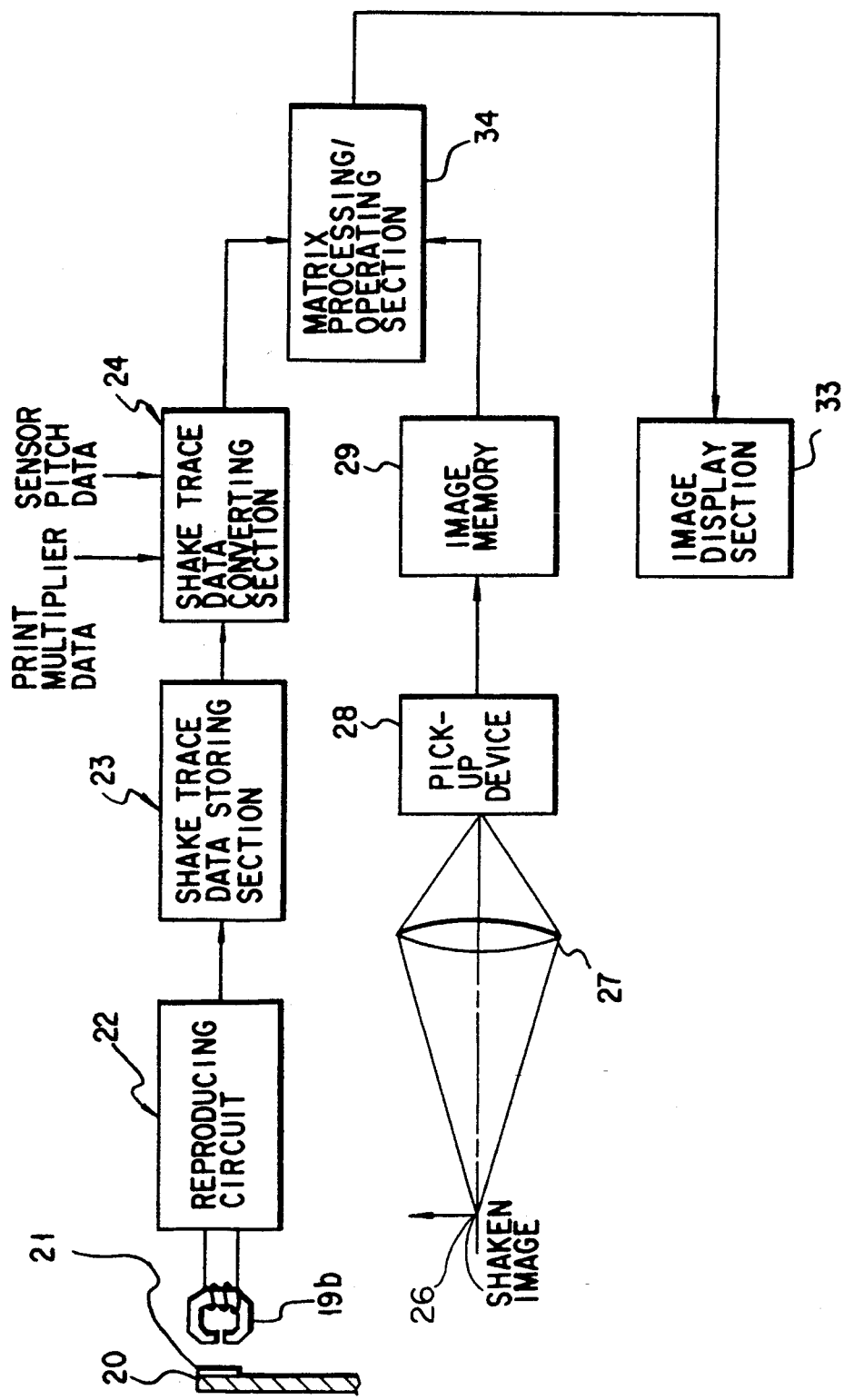
F I G. 9

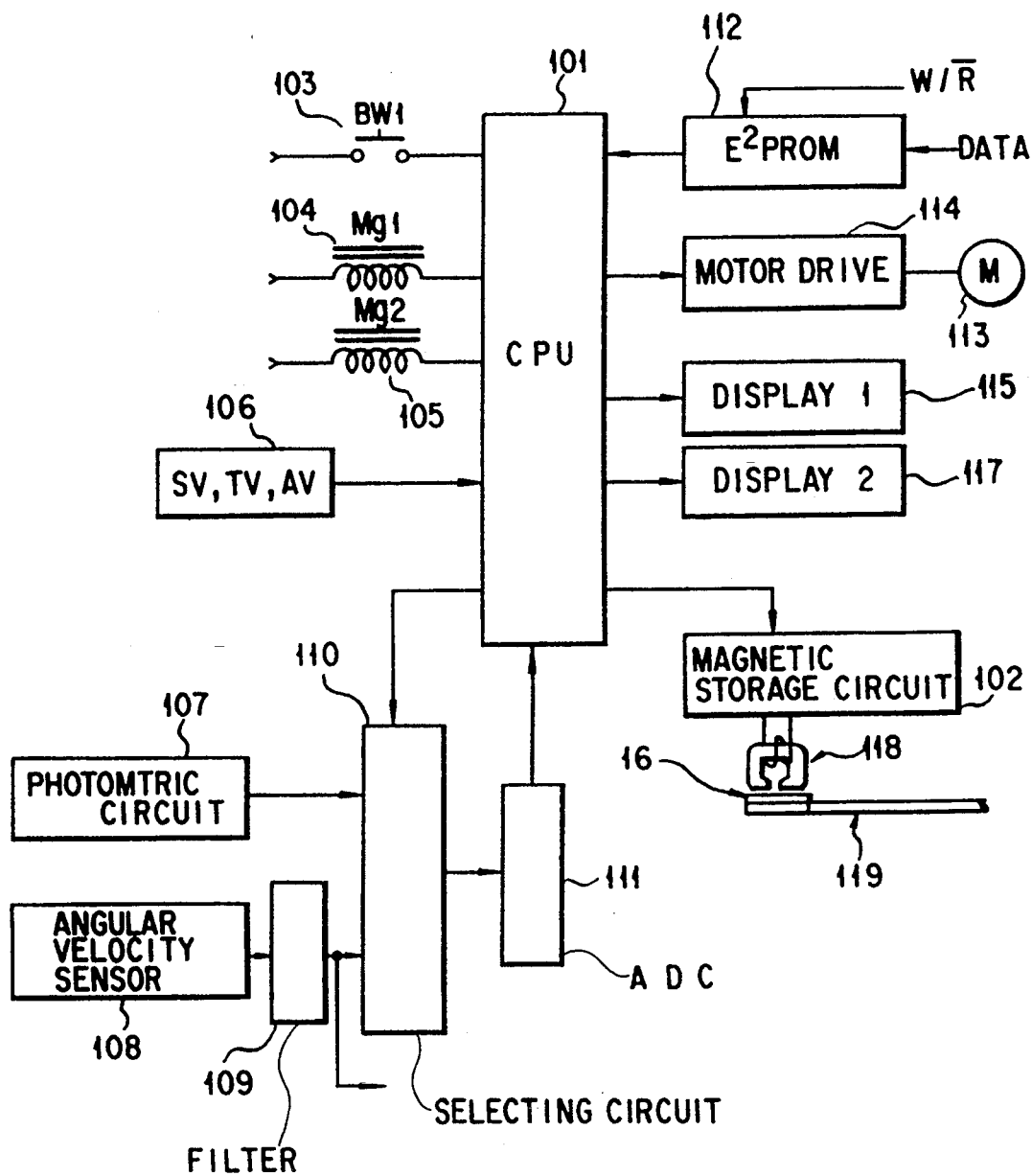
F I G. 11

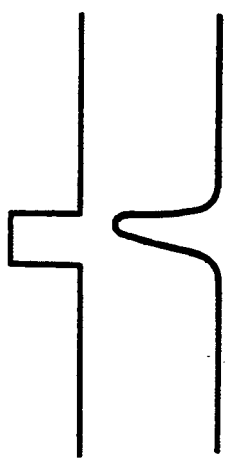
FIG. 14A (DRIVE PULSE)
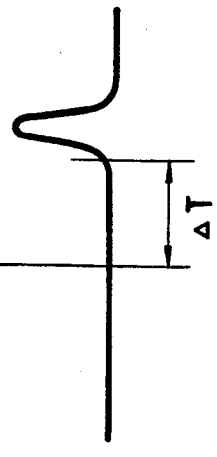
FIG. 14B (VIBRATION APPLIER)
FIG. 14C (ANGULAR VELOCITY SENSOR)
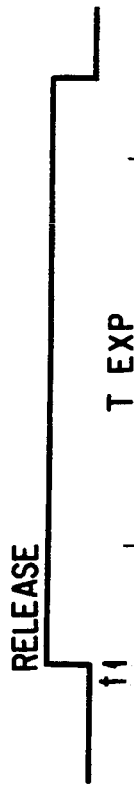
FIG. 15A (RELEASE)
FIG. 15B (EXPOSURE)
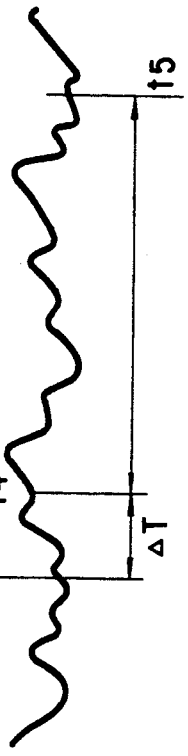
FIG. 15C (ANGULAR VELOCITY SENSOR)

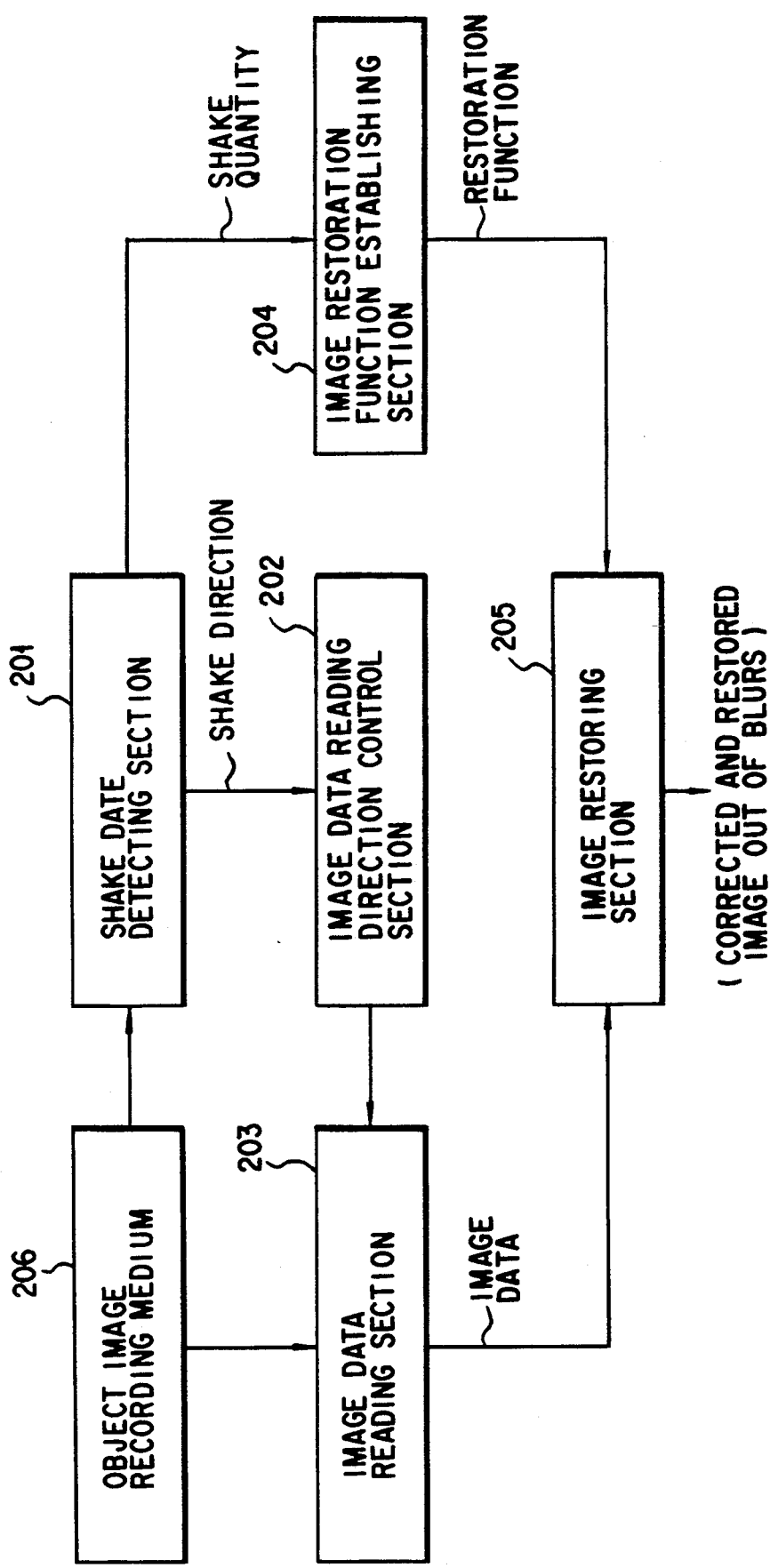
F I G. 17

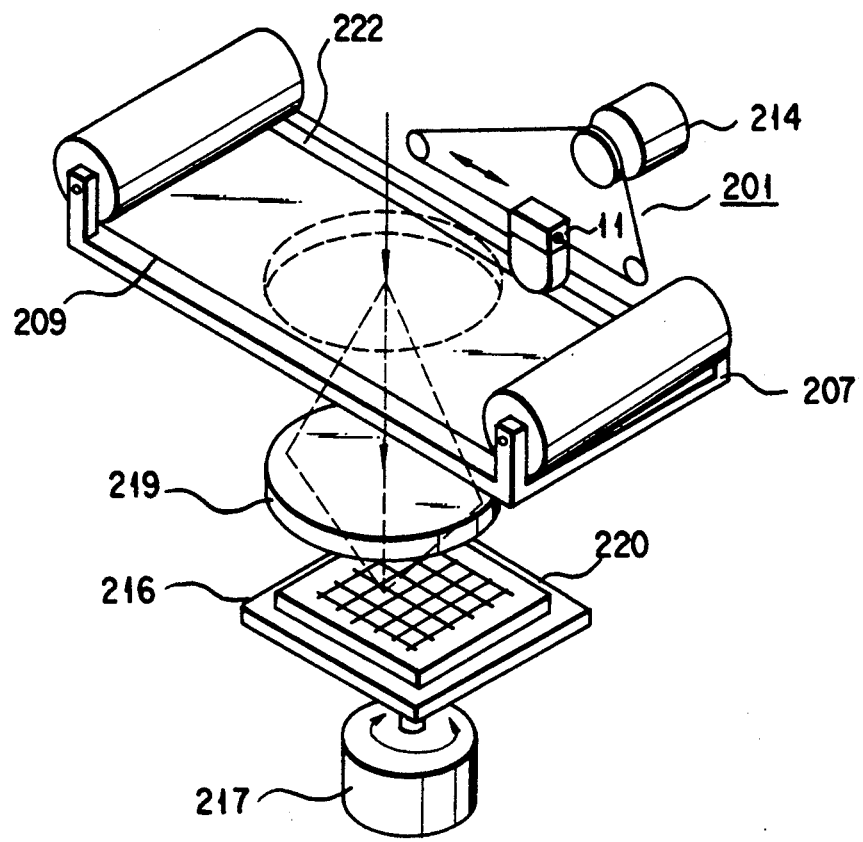
F I G. 18

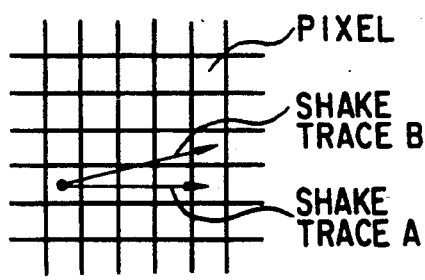
FIG. 21A
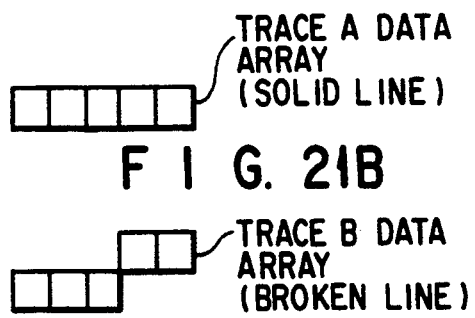
FIG. 21B
FIG. 21C
FIG. 22
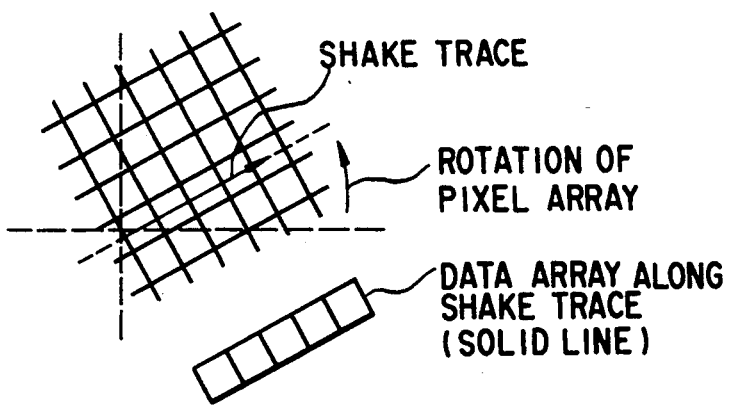
$$Ai,1 = \frac{1}{3}(Bi,1 + Bi,2 + Bi,3)$$
FIG. 23

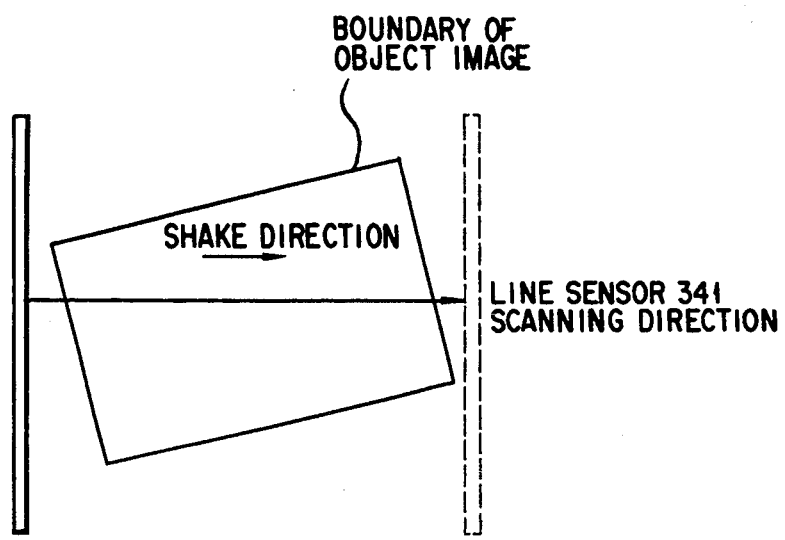
FIG. 24C
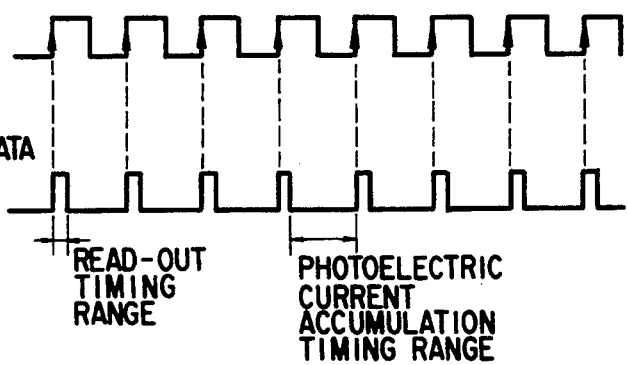
FIG. 25A (LINE SENSOR POSITION)
FIG. 25B (POSITION DETECTING PULSE)
FIG. 25C (LINE SENSOR DATA READ-OUT TIMING)
READ-OUT TIMING RANGE
PHOTOELECTRIC CURRENT ACCUMULATION TIMING RANGE

SHAKE-FREE IMAGE RESTORATION SYSTEM

BACKGROUND OF THE INVENTION

1. Field of the Invention

The present invention generally relates to a shake-free image restoration system and, more particularly, to a shake-free image restoration apparatus capable of producing steady and clear images or pictures as final outputs without installing an image correction device in the main body of a camera or other apparatus for shooting scenes incorporating the same. It also relates to a camera capable of restoring images from shakes on the basis of the data obtained for the shaking condition of the camera during film exposure by shake detecting and image restoring means incorporated in the camera main body.

The present invention further relates to an image restoration apparatus for restoring still pictures or images on films involving blurs caused by a shake and to regenerate them by compensating the blurs.

2. Description of the Related Art

A number of methods have been proposed to correct shaken and blurred picture images taken by cameras, including the following.

Firstly, "Youich Miyake: A Recommendable Way for image Processing, Shashin Kogyo, 109–113, 6/1987" describes a method of correcting a blurred image of an uniformly moving object, which can be summarized as follows. If an object f(x, y) being taken by a camera is moving in direction x at speed V for T seconds and the camera records an image g(x, y) of the moving object, then the relationship between the object and the image will be expressed by equation (1) below.

$$g(x,y) = \int_{-\frac{T}{2}}^{\frac{T}{2}} f(x - Vt, y) dt \quad (1)$$

when both sides are put to a Fourier transformation, then equation (2) below will be obtained.

$$G(u,v) = F(u,v) \int_{-\frac{T}{2}}^{\frac{T}{2}} \exp\{-j2\pi u Vt\} dt \quad (2)$$

Differently stated, the following relationship, or equation (3), will hold true.

$$H(u, v) = \sin \pi u Vt / \pi u V = T \sin C(uVT) \quad (3)$$

Then, by an inverse Fourier transformation of equation (4) below, the image of the object blurred by its motion will be restored.

$$F(u, v) = G(u, v)/H(u, v) \quad (4)$$

Secondly, Published Unexamined Japanese Patent Application No. 5-72592 discloses a method of correcting blurred images by driving the film by novel drive means.

Finally, Published Unexamined Japanese Patent Application No. 63-187883 discloses an invention of an image pick-up apparatus capable of processing the picked-up image, using the data collected on the shaking condition of the apparatus during the image pick-up operation.

An apparatus for detecting shaking conditions of an image pick-up apparatus during the image pick-up operation and correcting the obtained blurred image to put it back to a clear image by driving film or optical means such as lenses is required to accurately detect any shaking conditions of the camera and carry out quick and accurate image correcting operations.

An apparatus that meets these and other requirements will therefore inevitably be very large, although such a large apparatus would not be able to satisfactorily correct blurred images because its function is based on an assumption that the object is moving in a uniform motion whereas moving objects normally show a not uniform but random motion.

There have also been proposed techniques for recording the extent of the shake by hand of a camera observed while it is used for taking a picture, notifying the camera user of the recorded data and/or correcting the obtained blurred image by using the data. A sensor such as an acceleration sensor or an angular velocity sensor is used for the detection of shaking motion of a camera.

The above cited Published Unexamined Japanese Patent Application No. 63-187883 also discloses a technique of detecting the physical quantity of the shake by hand of a camera and recording the obtained data on a recording medium.

However, an acceleration sensor or an angular velocity sensor is hardly capable of providing correct data on the shake of a camera while it is being used for taking a picture because any attempt to improve the S/N ratio of the signal representing the data requires the use of one or a plurality of filters, which in turn delays the timing of signal transmission.

Moreover, since the technique disclosed in the above Published Unexamined Japanese Patent Application No. 63-187883 does not pay attention to the delay in the timing of signal transmission of such a sensor, it does not and cannot provide correct data on the shake of the camera that influences the picture being taken.

There have also been known image processing apparatuses capable of performing a photoelectric conversion for the image picked-up by an image pick-up apparatus and arithmetically further processing the image by means of a processing apparatus such as a computer. Various techniques have also been proposed for restoring pictures that are blurred due to a shake by hand of cameras when they are taken. With such techniques, a single spot is selected on a blurred picture and the penetration and expansion of the spot into the surrounding area is mathematically expressed so that the blur of the picture may be mathematically handled.

For instance, Published Unexamined Japanese Patent Application No. 62-127976 discloses a method of establishing mathematical functions respectively having the effects of offsetting "out of focus", "shake" and "aberration", applying them to picture signals of the obtained picture by means of a photoelectric transducer device and arithmetically processing them to restore the picture.

Published Unexamined Japanese Patent Application No. 3-159482 teaches a method of using picture signals and inverse matrixes of divergence functions for blurred pictures to restore the pictures that are free from blurs.

A method is also known of performing a Fourier transformation on picture data and divergence functions so that pictures may be corrected in a Fourier space to restore the pictures by Fourier transformation.

However, divergence functions for pictures blurred by a shake by hand of a camera is one-dimensional unlike those for pictures with out of focus images or those pictures carrying the phenomenon of aberration. In other words, when out of focus or aberration is involved, the image of a spot in a picture expands two-dimensionally to blur the picture, whereas the image of a spot expands in a picture so as to draw a trace of a motion to consequently make the picture unclear if a shake is involved.

While it has been known that a shake by hand of a camera typically has a frequency of less than several Hz at the position of the image on the camera, the shake appears as lines on the picture taken by the camera if the duration of exposure is several tenths seconds. In other words, since a shake by hand of a camera normally results in a linear trace of a motion for any spot in the picture, it will be safe to say that each of the divergence functions expressing the shake of a picture represents a curved line or, very probably, a straight line. (See FIGS. 21A, B and C.)

Thus, when reading out a picture by means of a photoelectric transducer device, the data for the picture take the form of pixels, each representing the data for a tiny discrete spot in the picture. So far as the divergence functions involved are generated uniformly and two-dimensionally, the orientation of pixel arrangement does not have any particular significance and similar data will be obtained for any orientation.

When, however, the divergence functions involved in an operation of processing a picture are one-dimensional, the picture data for the picture varies depending on the orientation of the matrix of pixels, meaning that the divergence functions to be used for restoring the picture can be inappropriate and useless for the picture data depending on the orientation. This is because, if the picture carries a linear trace of a motion of a spot which is slanted relative to the matrix of pixels, the data for the motion cannot be linearly arranged. In other words, if the matrix of pixels of a picture has a direction of arrangement different from the direction along which a motion of a spot occurs in the picture, the obtained picture data inevitably involves blurs given rise to by causes other than the shake and, therefore, the picture cannot be restored simply by means of the divergence functions for the shake.

Additionally, since the obtained picture data can contain data representing an area outside the boundary of the picture located at and near an end of the picture opposite to the direction along which the camera is moved and such data are indefinable for Fourier transformation if the divergence functions for the shake are used for a matrix, consequently, the picture is short of satisfactory restoration.

SUMMARY OF THE INVENTION

It is, therefore, an object of the present invention to provide a new and improved shake-free image restoration system that can restore a picture or image by storing the trace of the shake and mathematically processing the data.

It is another object of the present invention to provide a simple and inexpensive shake-free image restoration apparatus by minimizing the capacity of the data storage medium it comprises for storing data for a shaken picture.

It is still another object of the present invention to provide a camera capable of detecting proper shake signals and restoring a shake-free picture while it is being taken even if a shake detecting sensor it comprises transmits belated signals by storing data for a predetermined delay of signal transmission of the shake detecting sensor in a non-volatile memory disposed in the camera main body.

It is a further object of the present invention to provide an image restoration apparatus capable of eliminating any possible discrepancy between the divergence functions for a shake and the obtained image data as well as indefinable data representing an area outside the boundary of a picture.

According to an aspect of the present invention, the first object of the invention is achieved by providing a shake-free image restoration system to be used for camera films carrying a data recording medium thereon comprising:

an image pick-up device foe shooting a scene by exposing a film to the by way of an optical system and recording an image of the scene on the film;

shake detection means for detecting a shake quantity of the image pick-up device during the exposure of the film to the scene by said device;

shake data recording means for recording shake data representing the quantity of the shake on a recording medium on the film;

shake data reproducing means for reproducing the data representing the shake quantity recorded on a recording medium by the shake data recording means;

shake trace data transformation means for outputting shake transmitting functions generated on the basis of the data representing shake quantity reproduced by the shake data reproducing means;

first Fourier transformation means for carrying out a Fourier transformation on the shake transmitting functions output by the shake trace data transformation means;

image transformation means for transforming the image of the scene recorded on the film into digital signals;

second Fourier transformation means for carrying out a Fourier transformation on the digital signal transformed by the image transformation means;

dividing means for carrying out divisions on outputs from the first and second Fourier transformation means; and inverse Fourier transformation means for carrying out an inverse Fourier transformation on an output from the dividing means, an output from the inverse Fourier transformation means being an image of the scene free from any trace of the shake.

Additional objects and advantages of the invention will be set forth in the description that follows and in part will be obvious from the description or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of preferred embodiments given below, serve to explain the principles of the invention.

FIG. 1 is a schematic block diagram of the reproducing system of a first embodiment of the invention, which is a shake-free image restoration apparatus;

FIG. 2 is a coordinate representing a shake (Δx, Δ)y;

FIG. 3 is a schematic perspective view of a camera equipped with shake detection means;

FIG. 7 is a schematic illustration of shake data to be recorded on a modified first embodiment of the invention;

FIG. 8 is a schematic illustration of a pixel out-put of the sensor of the modified first embodiment of the invention of FIG. 7;

FIG. 9 is a schematic block diagram of the reproducing system of a shake-free image restoration apparatus for restoring shake-free images by means of a simultaneous system of linear equations of several unknowns;

FIG. 11 is a schematic block diagram of a third embodiment of the invention, which is a camera;

FIGS. 14A, 14B and 14C are graphs schematically illustrating a pulse applied to the vibration applier 22, a vibration of the vibration applier 22 and an out-put of the angular velocity sensor respectively;

FIGS. 15A, 15B and 15C are graphs schematically illustrating the timings of release, exposure and the output of the angular velocity sensor 8 respectively;

FIG. 17 is a schematic block diagram of a fourth embodiment of the invention, which is an image restoration apparatus;

FIG. 18 is a schematic perspective view of the embodiment of FIG. 17;

FIGS. 21A, 21B and 21C are graphic illustrations of (divergence functions representing) a blurred image produced as a result of a shake by hand of a camera;

FIG. 22 is a graphic illustration of an image data array obtained by rotating a corresponding pixel matrix;

FIG. 23 is a graphic illustration of a set of original image data and a corresponding set of detected image data;

FIGS. 24A, 24B and 24C are schematic illustrations of an image data reading section obtained by modifying that of the fourth embodiment; and FIGS. 25A, 25B and 25C are graphs illustrating the operation of the image data reading section of FIGS. 24A, 24B and 24C.

DETAILED DESCRIPTION OF THE PREFERRED EMBODIMENTS

Figure 4:
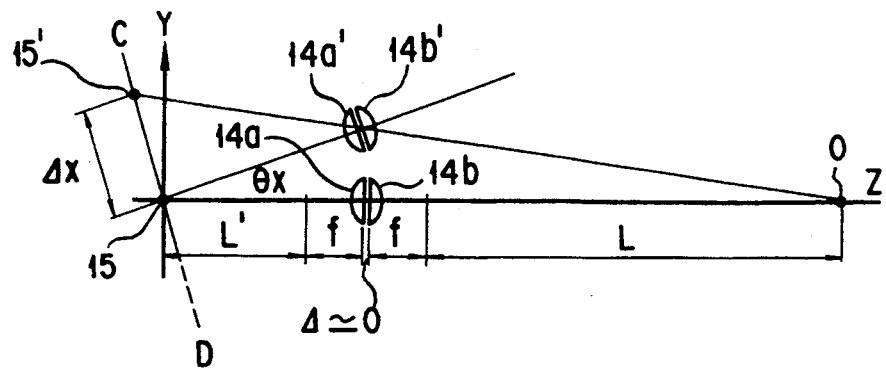
FIG. 4 is a schematic illustration showing how the image of an object is moved on X-Y plane when the camera main body is shaken to rotate by an angle of rotation of θx.

Reference will now be made in detail to the presently preferred embodiments of the invention as illustrated in the accompanying drawings, in which like reference characters designate like or corresponding parts throughout the several drawings.

Firstly, the first embodiment of the invention will be described.

To begin with, some of the theoretical aspects of the operation of restoring an image out of shakes by using shake trace data will be explained.

Shake trace data in the context of the present invention means shake quantity data Δx, Δy respectively obtained for the horizontal and vertical directions at predetermined regular intervals. Assume that, after rearranging the obtained data and counting the number of data representing an identical shaken position (Δx, Δy) a total of h such data are found. Then, the frequency of appearance of the position (Δx, Δy) is expressed by h.

FIG. 2 schematically illustrates an example of such a counting operation. In the drawing, the length of each of the arrows represents the frequency h at position (Δx, Δy). h is then generally expressed by function h(x, y), which will sometimes be referred to as the shake delivery function hereinafter.

If, on the other hand, the intensity distribution of the original image is expressed by function f(x, y), then the shaken image can be expressed by the convolution integral of f(x,y) and h(x,y) as expressed by equation (5) below.

$$g(x,y) = \int \int_{\infty}^{\infty} f(u,v)h(x-u, y-v)dudv \tag{5}$$

Equation (6) below is obtained by performing a Fourier transformation on the both sides of the above equation.

$$\begin{aligned} G(u,v) &= F(u,v) \cdot H(u,v) \\ g(x,y) &\longleftrightarrow G(u,v) \\ f(x,y) &\longleftrightarrow F(u,v) \\ h(x,y) &\longleftrightarrow H(u,v) \end{aligned} \tag{6}$$

Equation (4) presented earlier can be obtained from the above equation (6).

Thus, a shake-free image can be restored by carrying out an inverse Fourier transformation on F(u,v). In other words, the relation (4) indicates that a shake-free image can be restored by means of a two-dimensional Fourier transformation carried out on the original shaken image and a two-dimensional Fourier transformation carried out on the shake delivery function defined for it.

FIG. 3 is a schematic perspective view of a camera equipped with shake detection means. As shown, a three-dimensional orthogonal coordinate system is assigned to the camera, where Z-axis of the system is assigned to the optical axis of shooting lens system 12 fitted to the camera 11 while X- and Y-axes respectively represent horizontal and vertical lines perpendicular to the Z-axis. If the camera is pivoted, the angular components of the rotary movement around the Z-, X- and Y-axes are respectively expressed by $\theta z$, $\theta x$ and $\theta z$. The shake detection means 13 comprises angle sensors 13a and 13b, which detect respective angles of rotation $\theta x$ and $\theta y$. The angle of rotation $\theta x$ will represent the movement of the image taken by the camera on Y-Z plane defined by the Y- and Z-axes, whereas the angle of rotation $\theta y$ represents the movement of the image on X-Z plane defined by the X- and Z-axes.

FIG. 4 is a schematic illustration showing how the image of an object is moved on the X-Y plane when the camera main body 11 is shaken to rotate by an angle of rotation of $\theta x$. Then, a first lens 14a and a second lens 14b of the shooting lens system 11 are moved to respective positions indicated by 14a' and 14b'. Similarly, the image 15 of the object O will be moved to position 15' located on the image forming plane C-D which is inclined relative to the X-Y plane by an angle of $\theta x$. If the focal lengths of the first and second lenses 14a and 14b are equally f and the distances between the focal point of the lens 14b and the object O and between that of the lens 14a and the formed image are L and L' respectively, the quantity of movement of the image $\Delta x$ will be expressed by relation (7) below.

$$\Delta x = (1+\beta)^2 \cdot \theta_x \cdot f \tag{7}$$

In a similar way, when the camera main body 11 is shaken to rotate by an angle of rotation of $\theta y$, the quantity of movement $\Delta y$ of the image on the X-Z plane will be defined by equation (7') below.

$$\Delta y = (1+\beta)^2 \cdot \theta_x \cdot f \tag{7'}$$

where $\beta$ in the relations (7) and (7') is f/L, or the magnification of the shooting lens system. Since f in the relations (7) is an obtainable value specific to the shooting lens system, while the distance L that represents a value required to determine the value of f can be measured by means of a range finder (not shown) and the value of $\theta x$ can be obtained by the angle sensor 13a (FIG. 3) of the shake detection means, the quantities of movement $\Delta x$ and $\Delta y$ can be determined by using an arithmetic unit (not shown).

Furthermore, the angle sensor is used in the embodiment, but another sensor such as an acceleration sensor or an angular velocity sensor may be used to substitute the angle sensor.

Figure 5:
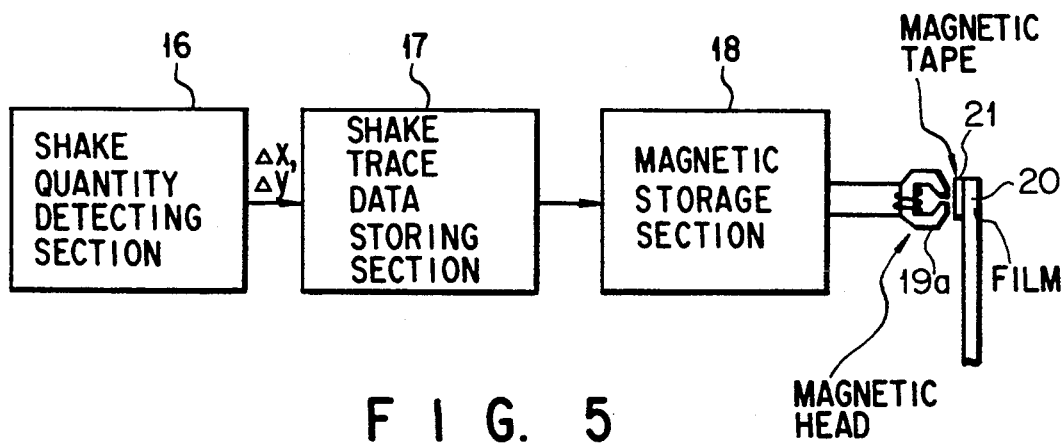
FIG. 5 is a schematic block diagram of a recording system of the first embodiment of the invention, or the shake-free image restoration apparatus of FIG. 1, for recording shake trace data on a magnetic tape fitted to an upper portion of a silver salt film by printing.

FIG. 5 is a schematic block diagram of a recording system of the first embodiment of the invention, or the shake-free image restoration apparatus of FIG. 1, for recording shake trace data on a magnetic tape fitted to an upper portion of a silver salt film by printing. Referring now to FIG. 5, shake quantity detecting section 16 detects horizontal and vertical shake quantities $\Delta x$, $\Delta y$ by using the technique as described above by referring to FIGS. 3 and 4. The shake quantity detecting section 16 sends out time-serial data $\Delta x$, $\Delta y$ at predetermined regular intervals, which are then temporarily stored in a shake trace data storing section 17 comprising RAMs. Then, $\Delta x$, $\Delta y$ are sent to magnetic storage section 18 at a given timing and in synchronism with the motion of film take-up and eventually stored on a magnetic tape 21 disposed on film 20 by means of a magnetic head 19a for data recording.

Figure 6:
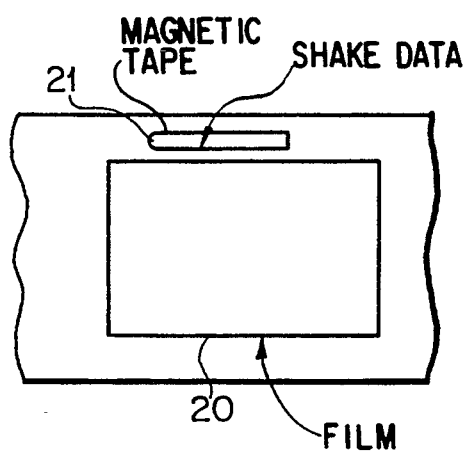
FIG. 6 is a fragmental schematic plan view of a film provided with a magnetic tape for recording shake data.

FIG. 6 is a fragmental schematic plan view of a film provided with a magnetic tape for recording shake data. The film 20 may typically carry a magnetic tape 21 on an upper portion thereof fitted thereto by printing as illustrated in FIG. 6.

Now, referring again to FIG. 1 showing a schematic block diagram of the reproducing system of a shake-free image restoration apparatus according to the invention that restores a shake-free image from a shaken image recorded on a film that also stores data on the shaking condition when the picture is taken, the shake trace data retrieved by a magnetic head 19a for data reproduction and a reproducing circuit 22 are temporarily stored in a shake trace data storing section 23 comprising RAMs and, thereafter, they are fed to a Fourier transformation (FFT) circuit 25 by way of a shake data converting section 24.

On the other hand, the negative shaken image 26 on the film is stored in an image memory 29 by way of an image pick-up lens system 27 and an image pick-up device 28 and, thereafter, fed to a divider section 31 by way of another FFT circuit 30 along with the data coming from said FFT circuit 25. The output data of the divider section 31 is put to an inverse Fourier transformation in an inverse Fourier transformation (inverse FFT) circuit 32, where the shake is offset, and then finally fed to an image display section such as a monitor TV or a printer.

Now, the operation of the reproducing system of the shake-free image restoration apparatus will be described in detail.

The shake trace data stored on the magnetic tape disposed on the film 20 is read out by the magnetic head 19b for data reproduction and put to a reproduction processing by the reproducing circuit 22 before they are temporarily stored in the shake trace data storing section 23. Thereafter, a shake delivery function h(x, y) as defined earlier is determined from the shake trace data in the shake trace data converting section 24.

It should be noted firstly that the magnification of the shaken image g(x, y) and that of the shake delivery function h(x, y) should agree with each other. Then, if an enlarged image g'(x, y) has a magnification of m, it will be expressed by equation (8) below.

$$g'(x, y) = g(x/m, y/m) \tag{8}$$

Likewise, any shake delivery function will be expressed by equation (9) below.

$$h'(x, y) = h(x/m, y/m) \tag{9}$$

It should also be noted that, since the elements of the image pick-up device 28 are discretely arranged at a predetermined pitch in both x- and y-directions, h'(x, y) needs to be transformed to discrete data h''(x, y) for each and every pixel unit area arranged at that pitch. Now, each unit square on the x-y plane in FIG. 2 corresponds to a pixel.

Thus, the shake delivery function can be transformed to a discrete data having a size equal to that of the discrete data of the shaken image g'(x, y). The length of each of the arrows in FIG. 2 can be determined by a procedure as described below.

Firstly, the frequency of data ($\Delta x$, $\Delta y$) or h($\Delta x$, $\Delta y$) in the entire data stored in the shake trace data storing section 23 is determined. This operation of determining the frequency is carried out for every different data. Secondly, the relation (9) is transformed. If, now, the sensor pitch in the x-direction is Px and the pitch in the y-direction is Py, the discrete shake delivery function h''(x, y) for the square which is the m-th in the x-direction and the n-th in the y-direction can be determined by relation (10) as shown below. This operation of determining a discrete shake delivery function is carried out for every different data.

$$\sum_{y=n-1}^{n} \sum_{x=m-1}^{m} h'(x,y) \tag{10}$$

The shake data converting section 24 in FIG. 1 exactly operates for determining such a discrete shake delivery function h''(x, y). Then, a two-dimensional Fourier transformation will be carried out on the h(x, y) to determine H'''(u, v).

On the other hand, the shaken image 26 is formed by shooting the object by means of the image pick-up lens system 27 and the two-dimensional image pick-up device 28 and stored in the image memory 29. Then, the shaken image g(x, y) is put to a Fourier transformation to produce G(u, v) by the FFT circuit 30 and, subsequently, relation (11) as shown below is determined by the divider section 31.

$$G(u, v)/H''(u, v) = F(u, v) \tag{11}$$

The result of carrying out the relation above is then put to an inverse Fourier transformation by the inverse FFT circuit 32 to produce F(u, v), which relation is then carried out to restore a shake-free image f(u, v). The restored shake-free image f(u, v) is transmitted to the image display section 33 for displaying a corrected and shake-free image.

In short, a shake-free image is restored in the above embodiment by applying Fourier transformation. Now, a modified embodiment that utilizes a simultaneous system of linear equations of several unknowns to restore a shake-free image will be described.

Figures 7, 8:
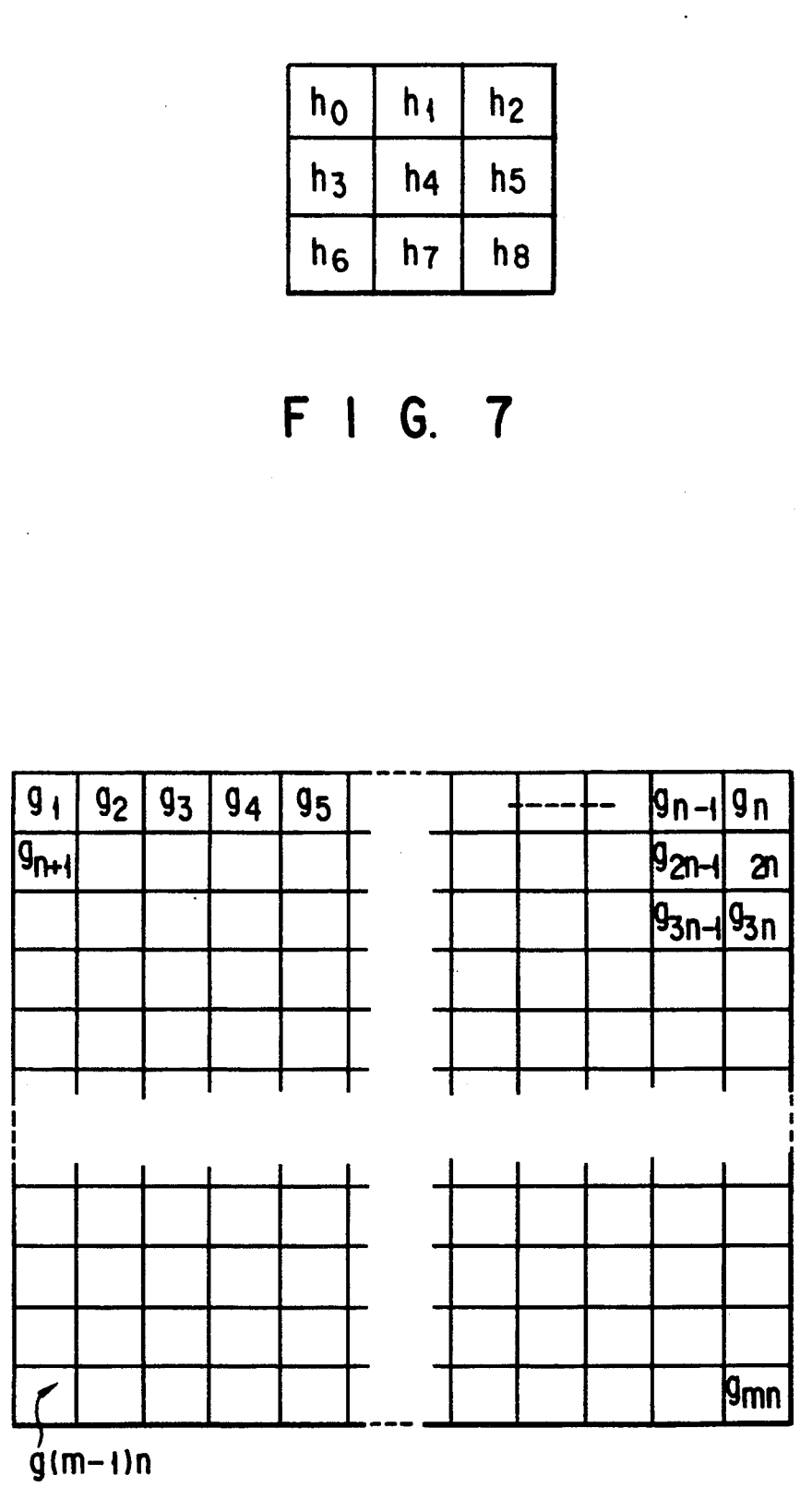

Assume here that shake data are relatively simple data as illustrated in FIG. 7, where each square has a size equal to that of each element of the sensor and $h_i$ (i=0, 1, ..., 8) represents a duration of exposure of the film. Thus, the duration of exposure will show a dispersion to give rise to a shaken image as a function of the position $h_i$.

FIG. 8 is a schematic illustration of a pixel output of the sensor of the modified embodiment. If sensor elements are designated respectively as $g_1$, $g_2$, ..., $g_n$, ..., $g_{(m-1)n}$, ..., $g_{mn}$ from the upper left corner and the shake-free image outputs of these sensor elements are respectively $f_1$, $f_2$, ..., $f_n$, ..., $f_{(m-1)n}$, ... $f_{mn}$, the following relations will hold true.

$$\begin{aligned}
g_1 &= f_1 h_4 + f_2 h_5 + 0 + \ldots + 0 + f_{n+1} h_7 + f_{n+2} h_8 \\
g_2 &= f_1 h_3 + f_2 h_4 + f_3 h_5 + 0 \ldots 0 + f_{n+1} h_6 + \\
    &\quad f_{n+2} h_7 + f_{n+3} h_8 \\
g_3 &= f_2 h_3 + f_3 h_4 + f_4 h_5 + 0 + \ldots + 0 + f_{n+2} h_6 + \\
    &\quad f_{n+3} h_7 + f_{n+4} h_8
\end{aligned} \tag{12}$$

-continued $$\begin{aligned}
g_{n+1} &= f_1 h_1 + f_2 h_2 + 0 \ldots + 0 + f_{n+1} h_4 + f_{n+2} h_5 + \\
    &\quad 0 + \ldots + 0 + f_{2n+1} h_7 + f_{2n+2} h_8 \\
g_{n+2} &= f_1 h_0 + f_2 h_1 + f_3 h_2 + 0 + \ldots + 0 + f_{n+1} h_3 + \\
    &\quad f_{n+2} h_4 + f_{n+3} h_5 + 0 + \ldots + 0 + f_{2n+1} h_6 + \\
    &\quad f_{2n+2} h_7 + f_{2n+3} h_8
\end{aligned}$$

$$g_{mn} = h_0 f_{(m-1)n-1} + h_1 f_{(m-n)n} + 0 + \ldots + 0 + h_3 f_{mn-1} + h_4 f_{mn}$$

The above relations can be expressed by a single vector as expressed by formula (13) below.

$$H = \eta \cdot ff \tag{13}$$

where the term (14) is a matrix of mn×mn and the terms (15) and (16) are respectively column vectors of the m- and n-degree.

$$\eta \tag{14}$$

$$H \tag{15}$$

$$ff \tag{16}$$

The original shake-free image expressed by the determinant equation (13) can be restored by solving it.

FIG. 9 is a schematic block diagram of the reproducing system of a shake-free image restoration apparatus realized by modifying that of the first embodiment and utilizing a simultaneous system of linear equations of several unknowns as described above. This apparatus differs from the first embodiment of FIG. 1 in that the FFT circuits 25 and 30 and the inverse FFT circuit 32 of the first embodiment are not present in this apparatus and the divider section 31 of the first embodiment is replaced by a matrix processing/operating section 34, which solves the above equations (12) and (13). Since the remaining components of the apparatus are similar to the corresponding ones of the apparatus of FIG. 1, they are designated by the same reference characters and will not be described any further.

while the present invention has been described in detail above, in terms of restoration of a shake-free image taken on a silver salt film by an optical camera, it would be needless to say that the underlying principle can also and equally be applied to an electronic camera or a video camera.

As is apparent from the above description, the present invention provides a shake-free image restoration apparatus that can correct shaken images or pictures carrying blurred images, given rise to by a shake, by processing them, and a handy and inexpensive shaken image correcting system that can easily restore clear images because the operation of restoring clear images involved in the present invention can be carried out in a film developing laboratory.

It may be noticed that, in the above first embodiment, if the intervals with which shake trace data are collected are held to a single value, data will become too coarse when the duration of exposure is short, whereas they will be too redundant when the duration is long.

Now, a second embodiment of the present invention which is designed to solve this problem will be described hereinafter only for those portions thereof that are different from the corresponding portions of the first embodiment.

Figure 10:
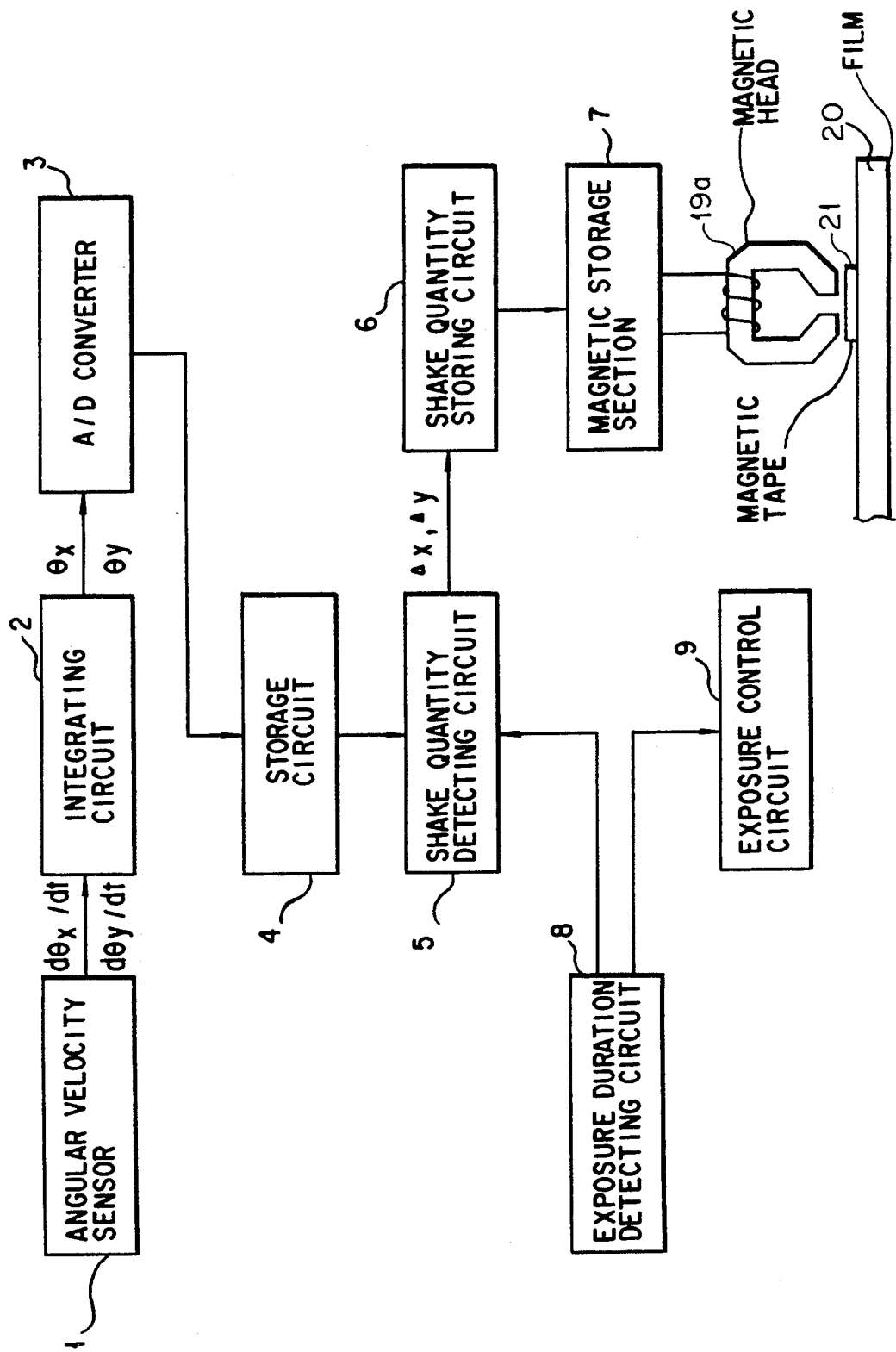
FIG. 10 is a schematic block diagram of a recording system of a second embodiment of the invention, which is a shake-free image restoration apparatus, for recording shake trace data on a magnetic tape fitted to an upper portion of a silver salt film by printing.

FIG. 10 is a schematic block diagram of a recording system of a second embodiment of the invention, which is a shake-free image restoration apparatus, for recording shake trace data on a magnetic tape fitted to an upper portion of a silver salt film by printing.

Referring now to FIG. 10, angular velocity sensor 1 calculates component angular velocities dηx/dt and dθy/dt for a rotary movement, using the method as described earlier by referring to FIG. 2 and produces voltages as output signals that are proportional to the determined angular velocities. The outputs of the angular velocity sensor 1 are then integrated in an integrating circuit 2 to determine the respective component rotary angles θx and θy, which are subsequently converted into digital data by an A/D converter 3 and stored in a storage circuit 4.

Thereafter, the shake quantity Δx of the image along the X-axis is determined by a shake quantity detecting circuit 5, using the equation (7), while the Δy of the image along the Y-axis is temporarily stored in a shake quantity storing circuit 6.

When all the shake data are obtained and stored, Δx and Δy are recorded on a magnetic tape 21 disposed on film 20 by means of a magnetic recording circuit 7 and a magnetic head 19a.

If, as mentioned earlier, the intervals with which shake trace data are collected are held to a single value, data will become too coarse when the duration of exposure is short. For instance, if the duration of exposure is 10 ms and the data sampling cycle of the A/D converter 3 has a period of 1ms, only ten (10) shake quantity data (Δx, Δy) will be obtained by a single sampling operation.

If, on the other hand, the duration of exposure is 500 ms and the A/D converter 3 has a data sampling cycle of a period of 1 ms, a total of 500 data will be required for a single sampling operation. Then, assuming that a single data requires one (1) byte, there will become necessary a memory capacity of 500÷2=1,000 bytes for storing the data, which is too large for a magnetic tape 21 disposed on a tiny area of a film 20.

To solve this problem in this embodiment, data on the duration of exposure obtained by an exposure duration detecting circuit 8 are fed to a shake quantity detecting and calculating circuit 5 in order to change the cyclic period ΔT of determining component shake quantities Δx, Δy depending on the duration of exposure. More specifically, the amount of ΔT is so controlled as to become linearly proportional to the duration of exposure TEXP. If, for instance, ΔT=TEXP/100[ms], then, ΔT=100 ms for TEXP=500 ms and
ΔT=0.1 ms for TEXP =10 ms.

Since the required memory capacity for storing data is 200 bytes for both cases, an identical level of accuracy will be ensured for both regardless of the duration of exposure. Note that exposure control circuit 9 in the embodiment as illustrated in FIG. 10 is a functional component that controls the film exposure of the camera.

Since the remaining components of this second embodiment are similar to those of the first embodiment, they will not be described any further here.

In short, since the above described second embodiment of shake-free image restoration apparatus can minimize the memory capacity of the recording medium for storing shake data, such an apparatus may be supplied at a significantly reduced cost.

Now, a third embodiment of the invention that can realize a camera main body capable of correcting the adverse effect of a shake will be described herein after.

FIG. 11 is a schematic block diagram of the third embodiment of the invention, which is in fact a camera.

Referring now to FIG. 11, CPU 101 is connected to a release switch 103, a shutter front diaphragm control magnet 104, a shutter rear diaphragm control magnet 105 and a data input section 106 for receiving data on the film SV, those on the shutter operating speed TV and those on the iris AV as well as other components.

Angular velocity sensor 108 for detecting shakes is on its part connected to an S/N improving CR filter 109, which CR filter 109 and a photometric circuit 107 are connected to an analog input selecting circuit 110. The analog input selecting circuit 110 is by turn connected to said CPU 101 by way of an A/D converting circuit 111.

An EEPROM 112 for storing data on the delay ΔT in the timing of the response signal of said angular velocity sensor 108 is also connected to the CPU 101. The input line "W/R" of the EEPROM 112 is a line for controlling the data write-in/read-out operation for the memory and the line "DATA" is a data input line for the data write-in operation.

Additionally, a motor drive circuit 114 for controlling the operation of a drive motor 113 for taking-up and rewinding a film, a display 115 for displaying data on the film winding speed and the shutter operating speed, a shake warning display 117 and a magnetic storage circuit 102 for writing shake data on the magnetic tape 116 fitted to a portion of the film 119 by means of a magnetic head 118 are also connected to the CPU 101.

Figure 12:
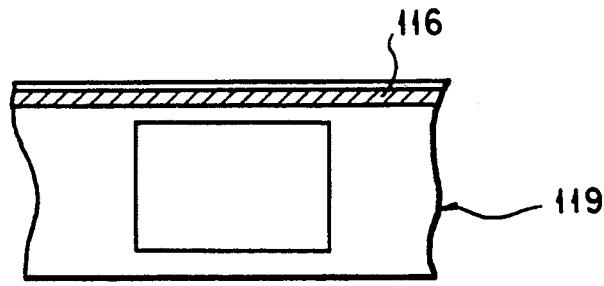
FIG. 12 is a fragmental schematic plan view of a film provided with a magnetic tape for recording shake data.

FIG. 12 is a fragmental schematic plan view of a film provided with a magnetic tape 116 for recording shake data at a portion above an image recording area.

Now, referring to the schematic block diagram of FIG. 13, how a delay ΔT in the timing of the response signal of the angular velocity sensor 108 for detecting shakes is stored in the EEPROM 112 in the process of manufacturing a camera according to the invention will be described below.

Figure 13:
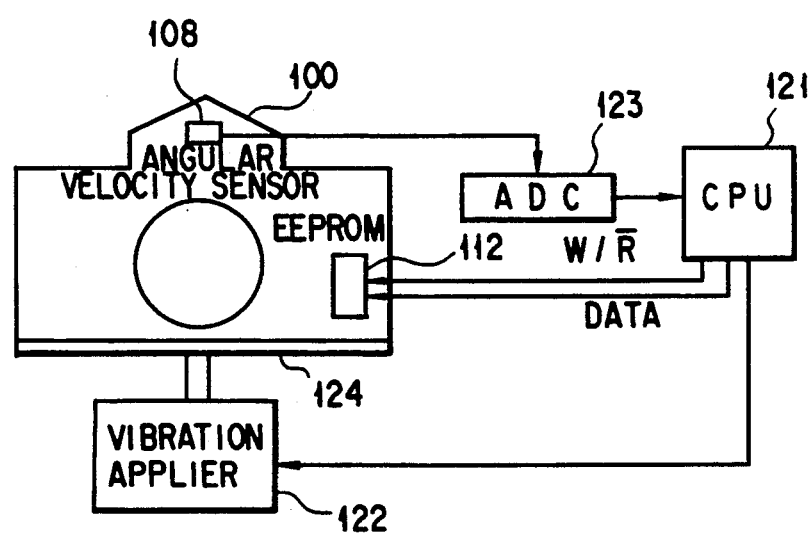
FIG. 13 is a schematic block diagram illustrating how delay ΔT in the timing of the response signal of an angular velocity sensor 8 for detecting shakes is stored in an EEPROM 12 in the process of manufacturing a camera according to the invention.
Figure 16:
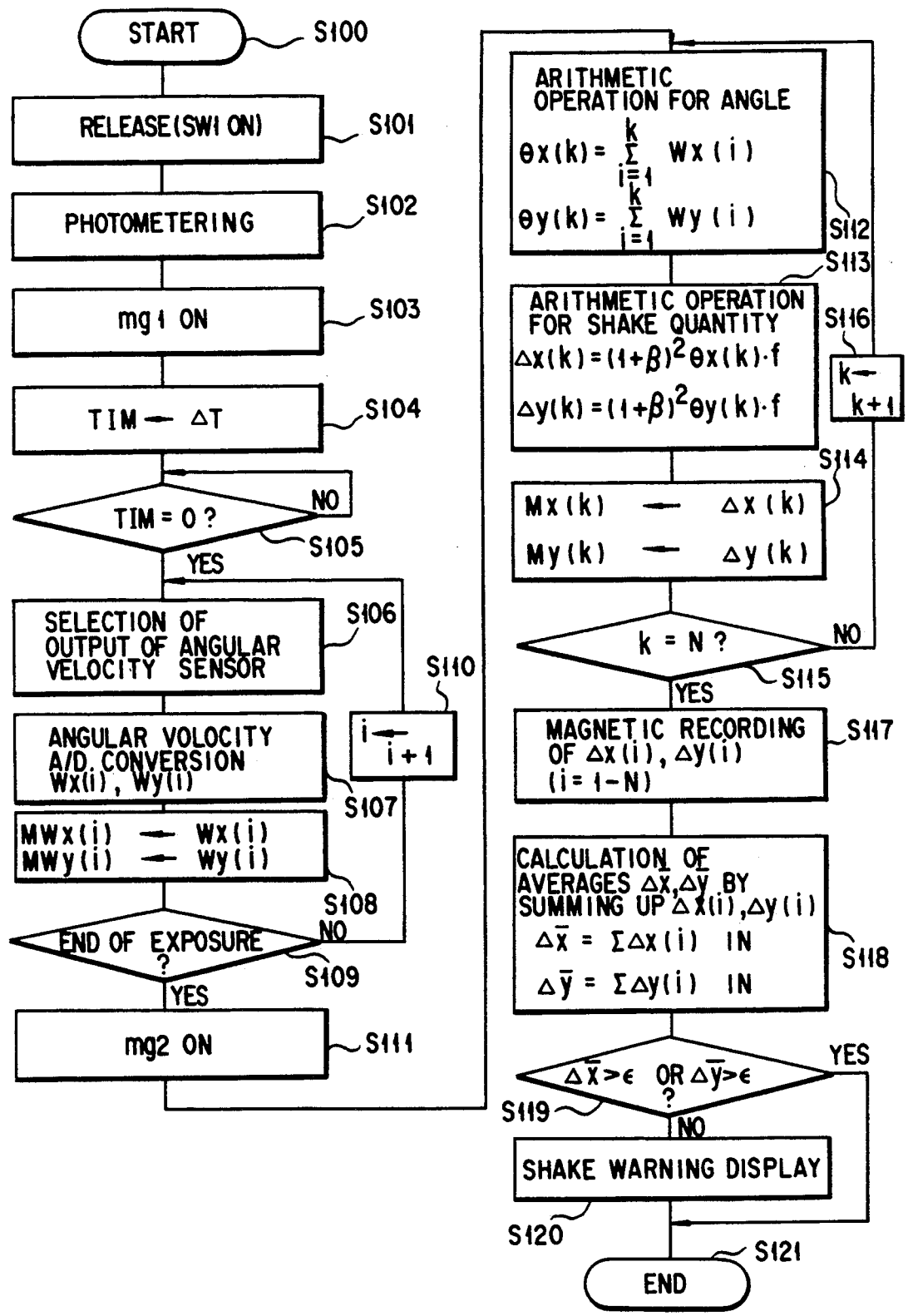
FIG. 16 is a flow chart illustrating the operation of the third embodiment of the invention, or the camera in FIG. 11.

As shown in FIG. 13, when the CPU 121 applies a drive pulse as illustrated in FIG. 14A to a vibration applier 122, the vibration applier 122 oscillates in a manner as illustrated in FIG. 14B.

On the other hand, the output terminal of the filter connected to an angular velocity sensor 108 is connected to an A/D converter 123, which transmits its output to the CPU 121.

Simultaneously with the application of the pulse to the vibration applicator 122, the output of the A/D converter 123 is read into the CPU 121. Then, with a delay of ΔT after the application by the vibration applier 122 of the pulse, a pulse as illustrated in FIG. 14C will be detected.

Thereafter, the CPU 121 sets the data write-in/read-out signal line "W/R" of the EEPROM 112 to a high level to write the data on the above ΔT into the EEPROM 112.

Now, the operation of writing the data on the delay in the timing of the response signal of the shake detecting angular velocity sensor 108 into the EEPROM 112 is completed. While the above described technique of the third embodiment may be recommended when disper- 206, which is film or photographic printing paper, as to make it agree with the shake direction of the image in order to read-out proper data on the object image.

The embodiment further comprises an image data reading section 203 for reading out data on the object image and an image restoration function establishing section 204, which establishes restoration functions from the data on the shake quantity of the image detected by said shake data detecting section 201 in order to modify and correct the blurred image on the basis of the functions defining the expansion of the image due to a shake.

Then, image restoring section 205 carries out a series of arithmetic operations to correct the data on the blurred image, using the object image data obtained from said image data reading section 203 and the restoration functions obtained by said image restoration function establishing section 204. (FIG. 22 illustrates an arrangement of image data obtained by rotating an array of pixels as will be described hereinafter.)

In the image restoration apparatus having a configuration as described above, the image restoration function establishing section 204 sets up functions expressing the expansion of an image due to a shake in the form of regular matrixes that defines the relationship between the one dimensional image data related to the array of pixels arranged in the shake direction and the data on the shake-free proper original image and then restoration functions comprising inverse matrixes for the above matrixes.

Thereafter, the restoration functions are arithmetically operated for the entire image so that an effective image restoration apparatus can be realized by using an image restoration function establishing section 204 and an image restoring section 205 having a relatively simple configuration.

Since this embodiment handles a shake of a camera as a linear motion along the direction of arrangement of the array of pixels on the plane of pixels, it may be so configured as to produce image data by extrapolation for an area out of a given side line of the picture carrying an image.

If such an image restoration apparatus is mounted on a camera so that the shake by hand that took place at the time of shooting the scene may be singled out from the shake data detected by the shake data detecting section of the image restoration apparatus and stored on the film, the camera will have an enhanced image restoration capability without requiring any complicacy of operation.

Figure 19:
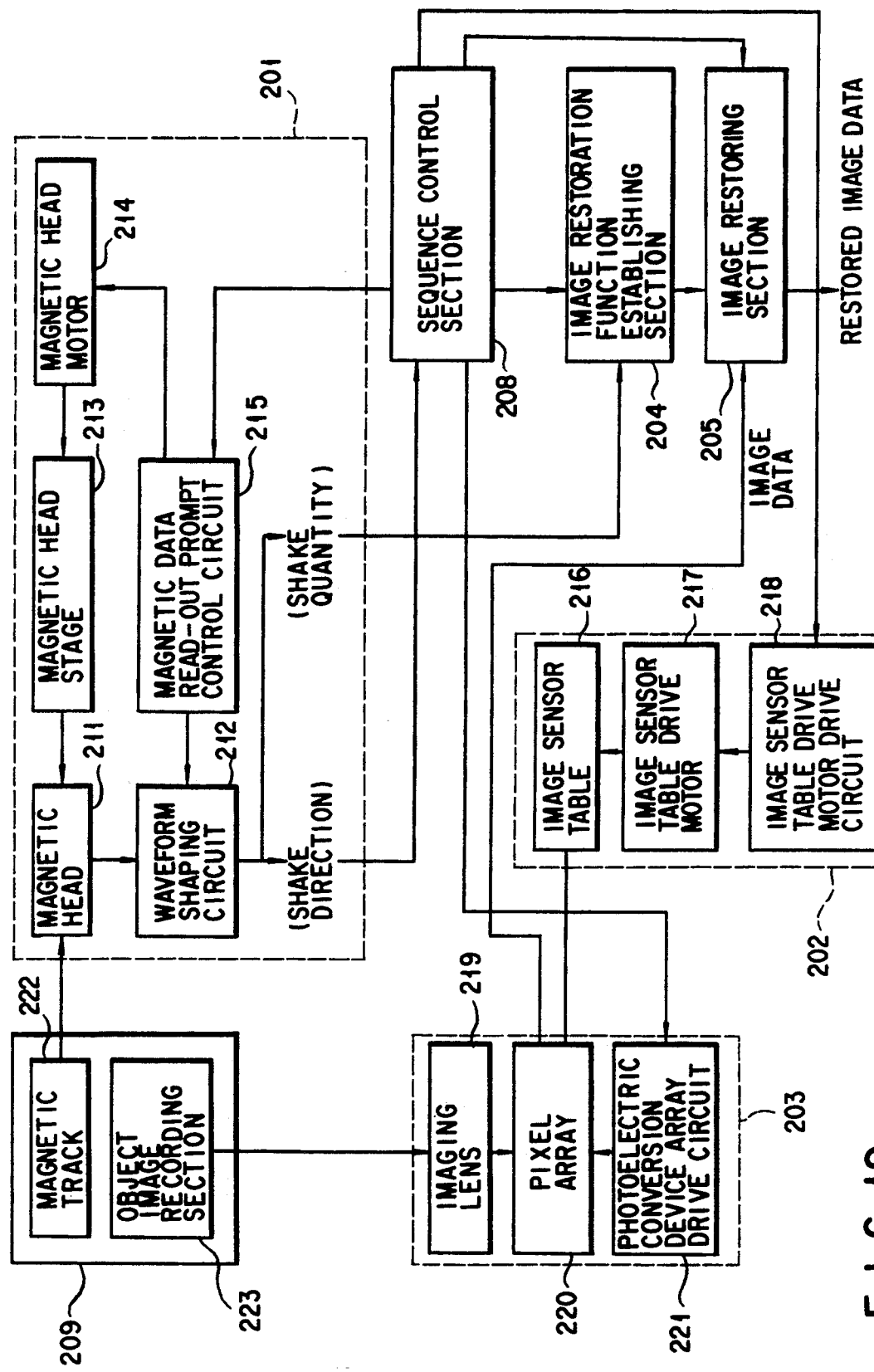
FIG. 19 is a block diagram of the fourth embodiment of the invention, or the image restoration apparatus of FIG. 17.

FIGS. 18 and 19 are respectively a schematic perspective view and a block diagram of the fourth embodiment of the invention, or the image restoration apparatus of FIG. 17. This embodiment records an object image on a film coated with a silver salt as well as data on the shake by hand of the camera at the time of shooting the scene and reproduces a shake-free image from the recorded data. The data on the shake will be recorded on a magnetic track 222 arranged on the silver salt film 209 in terms of "direction" and "extent" of the shake during the film exposure.

The components of the image restoration apparatus are driven and controlled by a sequence control section 208 comprising microcomputers (CPU).

The silver salt film 209 is provided with a magnetic track 222 typically arranged along the perforations and an object image recording section 223 for optically recording an image of the object.

The silver salt film 209 is then placed in position on a film loader 207 and taken up by the take-up spool of a feeding system (not shown). The shake data detecting section 201, the image data reading direction control section 202 and the image data reading section 203 are fitted to the film loader 27.

The shake data detecting section 201 comprises on its part a magnetic head 211, a waveform shaping circuit 212, a magnetic head stage 213, a magnetic head motor 214 and a magnetic data read-out prompt control circuit 215.

The magnetic data read-out prompt control circuit 215 moves the magnetic head 211 disposed on the magnetic head stage 213 along the magnetic track 222 on the film 209 according to the shake data read-out prompt signal it receives from the sequence control section 208 in order to read a magnetic signal and then the waveform shaping circuit 212 converts the magnetic signal into a shake signal. Thus, the direction and the extent of the shake become clear.

On the other hand, the image data reading direction control section 202 comprises an image sensor table 216, an image sensor table drive motor 217 and an image sensor table drive motor drive circuit 218, of which the image sensor table is controlled for its orientation by the shake direction signal transmitted from the sequence control section 208.

The image data reading section 203 comprises a pixel array 220 which is an array of electric charge storing type photoelectric conversion devices (CCD) arranged to form a two-dimensional grid work and a photoelectric conversion device array drive circuit 221 whose drive operation is controlled by the sequence control section 208. The image data reading section 203 is provided with an imaging lens 219 for projecting the object image on the silver salt film 109 which is mounted on the loader 207 onto the pixel array 220, which is mounted on the image send. For table 216.

The image data reading direction control section 202 controls the pivotal movement of the image sensor table 216 where the pixel array 220 is mounted by causing the image sensor table drive motor to operate until either one of the orthogonal "x- and y-axes" comes to agree with the shake direction indicated by the shake direction signal. The data on the object image read by the image data reading section 203 are transferred to the image restoring section 205.

Thereafter, the image restoration function establishing section 204 sets up restoration functions for correcting the shaken image and restoring a shake-free image on the basis of the functions expressing the expansion of an image due to a shake retrieved according to the data on the extent of the shake detected by the shake data detecting section 201. Then, the image restoring section 205 carries out arithmetic operations to correct the shaken image and restore a shake-free image, using the data on the image of the object obtained by the image data reading section 203 and the restoration functions set up by the image restoration function establishing section 204.

The image restoration function establishing section 204 operates in a manner as described hereinafter. Note that the retrieved data on the extent of the shake actually indicates the length of the trace of the movement of a spot on the object image given rise to by a shake. Also note that the spot on the object image on the film actually reflects a synthesized effect of the motions of various points of the object that have passed through the pixel of the spot.

Therefore, by knowing the length of the trace of the movement of a spot, the extent of synthesis of the motions of different points of the image can be determined. While image data are two-dimensional, the direction of the shake and that of the image data being read agree with each other in this case and, therefore, the synthesis of the motions of different points of the image (penetration of different points) takes place only one-dimensionally in a direction that agrees with the direction of arrangement of image data. Additionally, the image data reading direction control section 202 so controls the direction of reading operation of the image data reading section 203 that the shake direction agrees with the lateral direction of the pixel array.

n and m in the following formulas indicate the maximum address values for the columns and the rows respectively.

$$(A) = \begin{vmatrix} a1,1 & a1,2 & \ldots & a1,m \\ a2,1 & a2,2 & & \cdot \\ \cdot & & & \cdot \\ \cdot & & \ldots & \cdot \\ \cdot & & & \cdot \\ an,1 & an,2 & \ldots & an,m \end{vmatrix} \quad (19)$$

$$(B) = \begin{vmatrix} b1,1 & b1,2 & \ldots & b1,m \\ b2,1 & b2,2 & & \cdot \\ \cdot & & & \cdot \\ \cdot & & \ldots & \cdot \\ \cdot & & & \cdot \\ bn,1 & bn,2 & \ldots & bn,m \end{vmatrix} \quad (20)$$

Now, assume that a shake took place from right to left of the image to an extent of k pixels. Also assume that the shooting was carried out in a relatively short period of time and the shake was a uniform motion. Then, (1/k) of the data for each of the points of the original image that passed through a pixel on the image need to be added if the data for the original shake-free image are expressed by (B).

If only a row of pixels in the image data (A) and that of the original image data (B) are taken, they can be expressed respectively by matrixes (Ai) and (Bi) as show below.

$$(Ai) = \begin{vmatrix} ai,1 \\ ai,2 \\ \cdot \\ \cdot \\ \cdot \\ ai,m \end{vmatrix} \quad (21)$$

$$(Bi) = \begin{vmatrix} bi,1 \\ bi,2 \\ \cdot \\ \cdot \\ \cdot \\ bi,m \end{vmatrix} \quad (22)$$

Thus, equation (23) below can be obtained.

$$ai,j = \sum_{h=0}^{h=k-1} \{(1/k) \cdot (bi,j+h)\} \quad (23)$$
$$= (1/k) \sum_{h=0}^{h=k-1} bi,j+h$$

For the purpose of simplification, m=5 and k=3 are assumed for the above matrixes. Then, ai, 4 and ai, 5 can be determined by formula (24) for including bi, 6 and bi, 7 located out of the boundary of the original image.

$$ai(h = 1 \text{ to } 5) = (1/k) \cdot \begin{vmatrix} 1 & 1 & 1 & 0 & 0 & 0 & 0 \\ 0 & 1 & 1 & 1 & 0 & 0 & 0 \\ 0 & 0 & 1 & 1 & 1 & 0 & 0 \\ 0 & 0 & 0 & 1 & 1 & 1 & 0 \\ 0 & 0 & 0 & 0 & 1 & 1 & 1 \end{vmatrix} \cdot Bi(h = 1 \text{ to } 7) \quad (24)$$

when matrix (H) is defined by formula (25) below, then, inverse matrix (H') can be obtained by formula (26).

$$(H) = (1/k) \cdot \begin{vmatrix} 1 & 1 & 1 & 0 & 0 & 0 & 0 \\ 0 & 1 & 1 & 1 & 0 & 0 & 0 \\ 0 & 0 & 1 & 1 & 1 & 0 & 0 \\ 0 & 0 & 0 & 1 & 1 & 1 & 0 \\ 0 & 0 & 0 & 0 & 1 & 1 & 1 \end{vmatrix} \quad (25)$$

$$(Bi) = (H') \cdot (Ai) \quad (26)$$

Now, the original image can be restored.

The matrix (H) is an expansion function that defines the expansion of the shake.

As is apparent from the above description, since the shake direction is made to agree with the direction of arrangement of the array of pixels in this embodiment, a single and same function defining the expansion of a shake takes a satisfactory role with regard to a one-dimensional horizontal array.

It should be noted here that, since the matrix (H) is required to be a square matrix, the number of sets of data for the matrix (Bi) needs to be equal to "m".

In other words, the above described operations need to be carried out for Bi(h=1 to 5). Since m=5 is assumed now, 7 sets of data should be established out of 5 sets of data.

This requirement can be met by carrying out a corrective arithmetic operation that extrapolates the above data. Because, in this instance, the expansion of image data given rise to by a shake is directed only in the horizontal direction, the operation of extrapolation needs to be conducted on the detected data (Ai) only along the horizontal direction. Now, if the corrective arithmetic operation is carried out for the entire two-dimensional image data (A), the operation of extrapolation needs to be conducted on each (Ai) to enormously increase the total volume of operation. However, considering that the functions defining the extent of the shake are identical for every image data (Ai) arranged one-dimensionally and indicating the shake, the total volume of arithmetic operation can be reduced by providing the expansion function (H) with a capability of extrapolation.

Thus, there may be proposed a square matrix for the expansion function (H) in order to correct the shaken image and restore a shake free image.

$$(H) = (\tfrac{1}{3}) \cdot \begin{vmatrix} 1 & 1 & 1 & 0 & 0 \\ 0 & 1 & 1 & 1 & 0 \\ 0 & 0 & 1 & 1 & 1 \\ ? & ? & ? & ? & ? \\ ? & ? & ? & ? & ? \end{vmatrix} \quad (27)$$

where each ? represents a term that cannot provide a parameter for the extent of shake because of unavailability of sufficient data.

Now, the terms (?) pose problems to be solved for the embodiment.

In view of the equation (23) representing the relationship between the detected image data and the data for the original image, the portions of the equation that are related to the unknown terms are expressed by equations (28) and (29) below.

$$ai,4 = \sum_{h=0}^{h=2} \{(\tfrac{1}{3}) \cdot (bi,4 = h)\} = (\tfrac{1}{3}) \cdot \{bi,4 + bi,5 + bi,6\} \quad (28)$$

$$ai,5 = \sum_{h=0}^{h=2} \{(\tfrac{1}{3}) \cdot (bi,5 + h)\} = (\tfrac{1}{3}) \cdot \{bi,5 + bi,6 + bi,7\} \quad (29)$$

As illustrated in FIG. 23, the terms bi, 6 and bi, 7 represent data for an area outside the boundary of the image that are not included in the data obtained by the image sensor and therefore are unknown.

If the operation of extrapolation is performed by means of difference equations of first order, they are expressed by equations (30) and (31) below.

$$bi,6 = bi,5 + \text{(difference between } bi,4 \text{ and } bi,5) \quad (30)$$
$$= bi,5 + (bi,5 - bi,4)$$
$$= 2 \cdot bi,5 - bi,4$$

$$bi,7 = 2 \cdot bi,6 - bi,5 \quad (31)$$
$$= 3 \cdot bi,5 - 2 \cdot bi,4$$

From the equations (28) and (29), equations (32) and (33) are obtained.

$$ai,4 = (\tfrac{1}{3}) \cdot \{3 \cdot bi,5\} \quad (32)$$

$$ai,5 = (\tfrac{1}{3}) \cdot \{-3 \cdot bi,4 + 6 \cdot bi,5\} \quad (33)$$

Then, the expansion function (H1) for the extent of shake will be equation (34) below.

$$(H1) = (\tfrac{1}{3}) \cdot \begin{vmatrix} 1 & 1 & 1 & 0 & 0 \\ 0 & 1 & 1 & 1 & 0 \\ 0 & 0 & 1 & 1 & 1 \\ 0 & 0 & 0 & 0 & 3 \\ 0 & 0 & 0 & -3 & 6 \end{vmatrix} \quad (34)$$

If it is assumed that equation $d = j - m$ generally holds true provided that $k+m > j > m$, then equation (35) as shown below can be obtained.

$$bi,j = (d+1) \cdot bi,m - d \cdot bi,(m-1) \quad (35)$$

By establishing each terms of the expansion function depending on the extent of shake (k), similar expansion functions can be obtained for different extents of shake.

If difference equations of second order are used to improve the accuracy of extrapolation, bi, 6 and bi, 7 will be expressed by equations (36) and (37) below.

$$bi,6 = bi,5 + (bi,5 - bi,4) + \quad (36)$$
$$\{(bi,5 - bi,4) - (bi,4 - bi,3)\}$$
$$= 3 \cdot bi,5 - 3 \cdot bi,4 + bi,3$$

$$bi,7 = 3 \cdot bi,6 - 3 \cdot bi,5 + bi,4 \quad (37)$$
$$= 3 \cdot (3 \cdot bi,5 - 3 \cdot bi,4 + bi,3) - 3 \cdot bi,5 + bi,4$$
$$= 6 \cdot bi,5 - 8 \cdot bi,4 + 3 \cdot bi,3$$

In this case, equations (38) and (39) can be obtained from the equations (28) and (29) above.

$$ai,4 = (\tfrac{1}{3}) \cdot \{bi,3 - 2 \cdot bi,4 + 4 \cdot bi,5\} \quad (38)$$

$$ai,5 = (\tfrac{1}{3}) \cdot \{4 \cdot bi,3 - 11 \cdot bi,4 + 10 \cdot bi,5\} \quad (39)$$

Then, expansion function (H2) will be expressed by equation (40) below.

$$(H2) = (\tfrac{1}{3}) \cdot \begin{vmatrix} 1 & 1 & 1 & 0 & 0 \\ 0 & 1 & 1 & 1 & 0 \\ 0 & 0 & 1 & 1 & 1 \\ 0 & 0 & 1 & -1 & 4 \\ 0 & 0 & 4 & -11 & 10 \end{vmatrix} \quad (40)$$

In this case again, by establishing each of the terms of the expansion function depending on the extent of shake (k), similar expansion functions can be obtained for different extents of shake and arrangement of pixel data.

Since the matrixes (H1) and (H2) of these expansion functions are regular matrixes, inverse matrixes can be obtained for them.

Thus, inverse matrix (H1') for matrix (H1) of the expansion function having the capability of extrapolation by difference of first order can be obtained by a known method.

$$(H1') = 3 \cdot \begin{vmatrix} 1 & -1 & 0 & 2/3 & -1/3 \\ 0 & 1 & -1 & 1/3 & 0 \\ 0 & 0 & 1 & -1 & 1/3 \\ 0 & 0 & 0 & 2/3 & -1/3 \\ 0 & 0 & 0 & 1/3 & 0 \end{vmatrix} \quad (41)$$

Similarly, inverse matrix (H2) for matrix (H1) of the expansion function having the capability of extrapolation by difference of second order will be as shown below.

$$(H2') = 3 \cdot \begin{vmatrix} 1 & -1 & 2/11 & 2/11 & -1/11 \\ 0 & 1 & -40/33 & 5/11 & -2/33 \\ 0 & 0 & 34/33 & -7/11 & 5/33 \\ 0 & 0 & 2/11 & 2/11 & -1/11 \\ 0 & 0 & -7/33 & 5/11 & -2/33 \end{vmatrix} \quad (42)$$

Then, original image data (Bi) can be obtained by carrying out arithmetic operations for the equation (26) described earlier.

The two-dimensional entire object image can be restored by performing similar operations for each and every one-dimensional horizontal array of pixels along the shake direction of the image.

In other words, arithmetic operations are carried out for the equation (26) for i=1 to n or all the vertically arranged arrays of pixels.

Note here that the restoration function (H') can have a same value for all values of i. The operation of image restoration takes place in the image restoring section 205.

Also note that the above described arithmetic operations for determining an inverse matrix for the matrix of the restoration function set up by the image restoration function establishing section 204 may be carried out in order to correct the shaken image each time when such a matrix is required or, alternatively and if the memory device has room for data storage, such operations may be carried out in advance for a number of different extents of shake and the obtained inverse matrixes may be stored in the memory so that any appropriate inverse matrix may be retrieved for use simply by referring to a table listing the matrixes. The latter technique will significantly reduce the time required for image restoration.

while the use of difference equations of first or second order is described above for the extrapolation of data, the present invention is not limited thereto and other appropriate techniques may also be used to define the terms of the matrix in such a manner that unknown data may be determined by extrapolation.

If the extent of shake is large, the accuracy of image correction and restoration can be improved by taking a large number for the order of extrapolation (difference equations in the above description).

If, to the contrary, the extent of shake is small, a high accuracy of image correction and restoration may be ensured by selecting a relatively small number for the order of extrapolation to reduce the time required for the arithmetic operations.

while a relatively small value was used for the number of image data and the extent of shake for the purpose of simplicity of explanation in the above description of the embodiment, it may be obvious that any value may be selected for the purpose of the invention.

Figure 20:
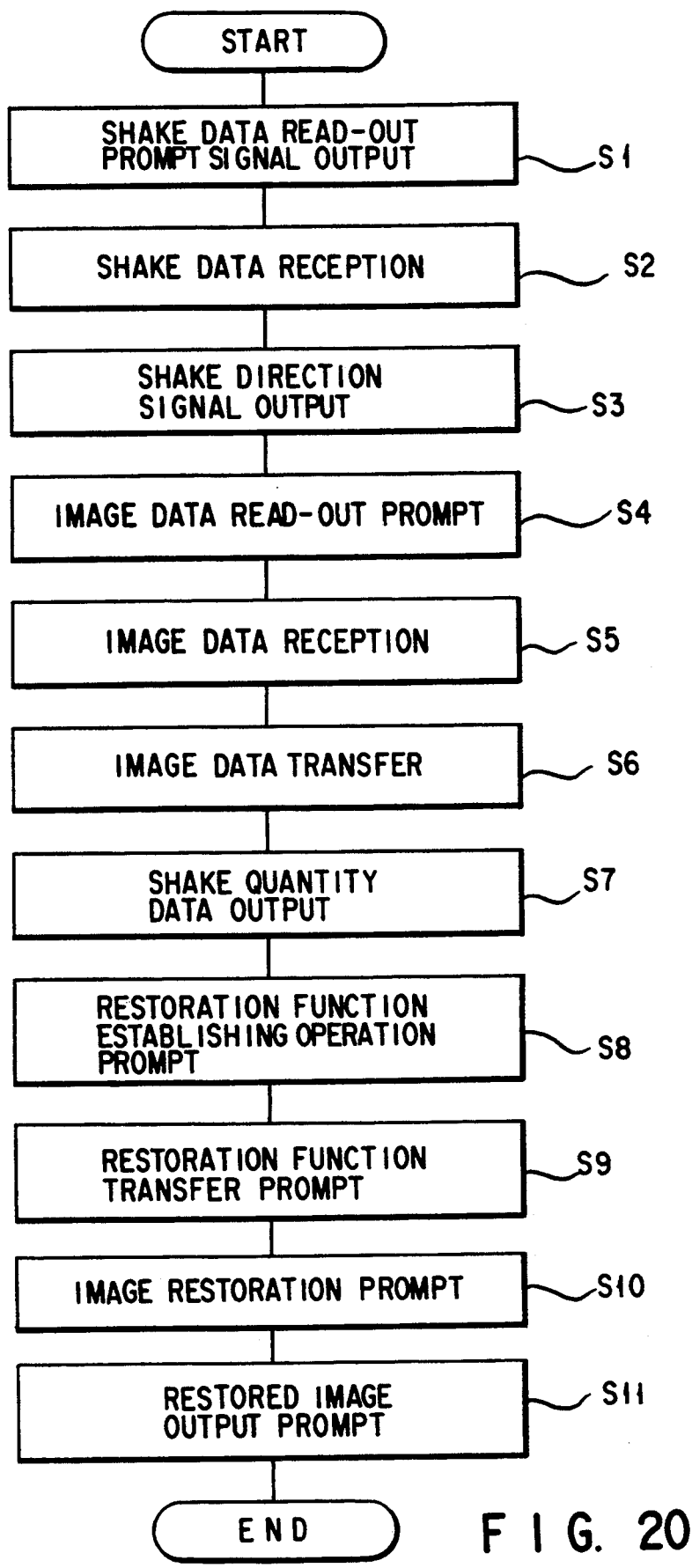
FIG. 20 is a flow chart illustrating the operation of the fourth embodiment of the invention, or the image restoration apparatus of FIG. 17.

Now the operation of the fourth embodiment will be described by referring to the flow chart of FIG. 20. It is assumed here that a film 209 is fitted to the film loader 207.

To begin with, the sequence control section 208 sends out a shake data read-out prompt signal to the shake data detecting section 201 for data retrieval from the film (step S1).

Then, the sequence control section 208 receives data on the shake direction from the shake data detecting section 201 (step S2). Thereafter, the sequence control section 208 transmits a shake direction signal to the image data reading direction control section 202 (step S3). As a result, the image sensor table 216 is rotated to a position where the direction of arrangement of the pixel array 220 of the image sensors of the image data reading section 203 agrees with the shake direction.

Subsequently, the sequence control section 208 prompts the image data reading section 203 to read image data on the object (step S4). Consequently, the image data reading section 203 receives image data on object (step S5). Then, the image data on the object are transferred to the image restoring section 205 (step S6).

Thereafter, the shake data detecting section 201 transmits shake quantity data to the image restoration function establishing section 204 (step S7). Then, the sequence control section 208 prompts the image restoration function establishing section 204 to carry out arithmetic operations on the functions set up on the basis of the data on the extent of the shake to express the expansion of the image as well as the established restoration functions for image correction and restoration (step S8).

Then, the shake sequence control section 208 prompts the image restoration function establishing section 204 to transfer the required restoration functions to the image restoring section 205 (step S9) and the image restoring section, and subsequently prempts the image restoring section 205 to restore the image of the object (step S10).

Finally, the sequence control section 208 prompts the image restoring section 205 to transmit the image data on the restored image (step S11).

After the above steps, the data on the restored image are processed by an image reproducing monitor apparatus or an image printing apparatus of a known type to display a restored visual image of the object.

While the image pick-up apparatus is so designed that it magnetically records data on the extent and the direction of the shake of the apparatus on the film simultaneously at the time of optically shooting the object, it may alternatively be so designed as to electrically record such data on a ROM (read-only memory) or a RAM (random access memory). Still alternatively, data on the shake of the apparatus may be obtained directly from the image data on the object by employing appropriate image processing means.

Therefore, with the above described fourth embodiment of image restoration apparatus of the invention, the direction of arrangement of the pixel array of the obtained image is always made appropriate for the image expansion functions established to express the shake at the time of optically shooting the object. Consequently, data for those undefined portions that are out of the boundary of the image can be obtained without difficulty to supplement the data for the image so that the image blurred by a shake at the time of shooting can be accurately corrected. Thus, such an image pick-up apparatus will be able to accurately record an image of a dark or remote object, possibly by using a telephoto lens system, that any known image pick-up apparatus have not been able to do so.

It may be needless to say that the present invention is not limited to the above embodiment and various modifications may be made thereto without departing from the spirit and the scope of the invention.

Now, a modified image data reading section 303 obtained by modifying that of the above fourth embodiment will be described.

Figure 24A:
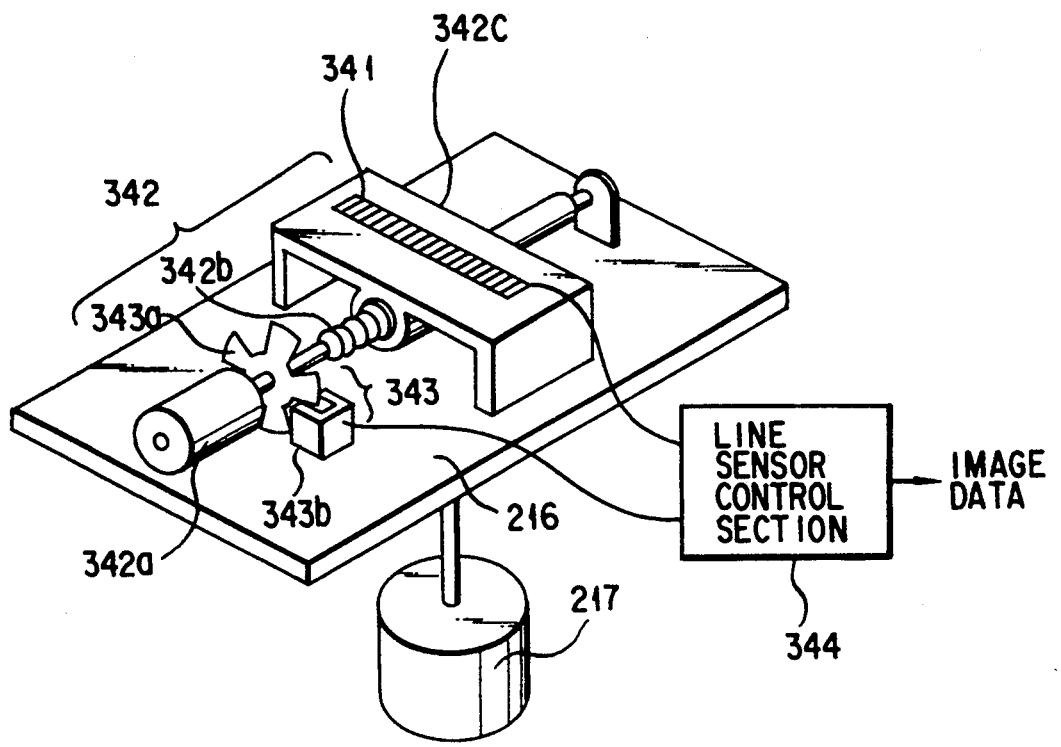
Figure 24B:
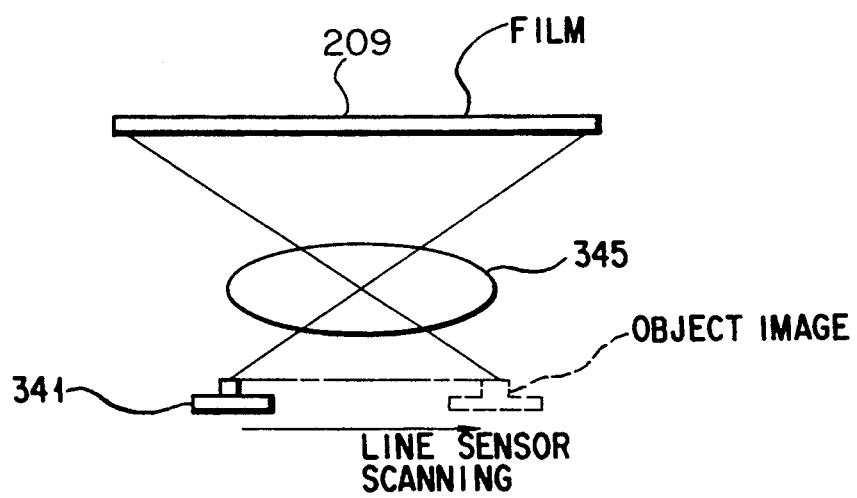

Referring to FIGS. 24A and 24B, this modified image data reading section 303 comprises a line sensor 341 including by an array of a number of pixels which are so many one-dimensionally arranged photoelectric conversion devices, a line sensor drive mechanism 342 having a motor and a transmission gear system for driving the line sensor to move to a position perpendicular to the direction of arrangement of the pixel array, a line sensor motion detecting section 343 having a photointerrupter for detecting any motion of the line sensor 341 and generating a pulse for every unit motion of the line sensor 341, a line sensor control section 344 for controlling the operation of photoelectric conversion of the line sensor 341 and reading data there from and an imaging lens system 345 for projecting a set of image data on the film 209 onto the line sensor 341.

The line sensor 341, the line sensor drive mechanism 342 and the line sensor motion detecting section 343 are arranged on the image sensor table 216 of the image data reading direction control section 202, which drives the image sensor table 216 according to the shake direction signal from the shake data detecting section 201 in such a manner that the direction of arrangement of the pixel array of the line sensor 341 becomes perpendicular to the shake direction or, in other words, the direction along with the line sensor drive mechanism 342 drives the line sensor 341 (the scanning direction) agrees with the shake direction. (See FIG. 24C.)

The line sensor drive mechanism 342 for driving the line sensor 341 comprises on its part a motor 342a, a feed screw section 342b and a line sensor fitting table 342c and the line sensor 341 is driven by the motor 342a to move along the axis of the feed screw section 342b on the line sensor fitting table 342c.

The line sensor motion detecting section 343 that detects any motion of the line sensor 341 comprises a turn plate 343a having radial slits and blades and a photointerrupter 343b for detecting any interruption of rays of light by one of the blades of the turn plate 343a. Upon detecting a motion of the line sensor 341 caused by rotary movement of the feed screw section 342b by way of that rotary movement, the line sensor motion detecting section 343 transforms the detected motion into a pulse signal.

The image recorded on the film is projected on the scanning plane of the line sensor 341 by means of the imaging lens system 345. (See FIG. 24B.)

The motion detecting operation of the line sensor motion detecting section 343 is repeated at a frequency required to ensure a desired accuracy level and a pulse is sent out from the section each time it detects a motion. The line sensor control section 344 controls the line sensor 341 to drive it in synchronism with the operation of pulse transmission and also reads data from the latter, meaning that consequently the line sensor 341 is made capable of reading two-dimensional image data. (See FIGS. 25A, 25B and 25C.)

while the direction of movement of the line sensor 341 is made to agree with the shake direction in the above description, the direction of arrangement of the component devices of the line sensor 341 may alternatively be made to agree with the shake direction.

It is not a mandatory requirement to make the direction of arrangement of the pixel array of the line sensor perpendicular to that of its movement and, the only requirement to be met is to be able to accurately locate the spot of the object image that corresponds to the read out image data.

As described above, by causing the photoelectric conversion devices to scan the object image, a large volume of image data can be obtained by a limited number of photoelectric conversion devices for a wide two-dimensional area. It should also be noted that the line sensor may be replaced by an area sensor arranged for two-dimensional scanning. While more than one photoelectric conversion devices are used for the above described line sensor, a single photoelectric conversion device may alternatively be used to achieve the same scanning effect by using two sensor drive mechanisms that can drive the sensor two-dimensionally. The same scanning effect may also be achieved by driving not the photoelectric conversion devices but the film to move.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A shake-free image restoration system to be used for camera films carrying a recording medium thereon, comprising:
   an image pick-up device for shooting a scene by exposing a film by way of an optical system and recording an image of the scene on the film;
   shake quantity detecting means for detecting a shake quantity of the image pick-up device during the exposure of the film to the scene by said image pick-up device;
   shake data recording means for recording data representing the shake quantity on a recording medium on the film;
   shake data reproducing means for reproducing said data representing the shake quantity recorded on the recording medium by said shake data recording means;
   shake trace data transformation means for outputting shake transmitting functions generated on the basis of the data representing the shake quantity reproduced by said shake data reproducing means;
   first Fourier transformation means for carrying out a Fourier transformation on said shake transmitting functions output by said shake trace data transformation means;
   image transformation means for transforming said image of the scene recorded on said film into digital signals;
   second Fourier transformation means for carrying out a Fourier transformation on said digital signals transformed by said image transformation means;
   dividing means for carrying out divisions on outputs from said first and second Fourier transformation means; and
   inverse Fourier transformation means for carrying out an inverse Fourier transformation on an output from said dividing means, an output from said inverse Fourier transformation means being an image of the scene free from any trace of the shake.

2. A shake-free image restoration system according to claim 1, wherein said shake data recording means comprises means for recording the data on a magnetic recording section disposed on the film surface with a magnetic head.

3. A shake-free image restoration system according to claim 1, wherein said shake quantity detecting means comprises means for detecting a shake quantity along the X- and Y-axes of an orthogonal coordinate system, and said shake data recording means records the shake quantity along the X- and Y-axes on said recording medium.

4. A shake-free image restoration system according to claim 3, wherein said shake quantity detecting means comprises means for detecting the frequency of a shake quantity along the X- and Y-axes of an orthogonal coordinate system, and said shake data recording means records the shake quantity along the X- and Y-axes of an orthogonal coordinate system as well as the frequency of the shake quantity.

5. A shake-free image restoration system according to claim 1, said system further comprising:
exposure duration detecting means for detecting a duration of exposure of said image pick-up device; and
shake quantity storing means for storing the detected shake quantity with a sampling cycle determined by the exposure duration detected by said exposure duration detecting means.

6. An object image restoration apparatus for restoring an image record on a recording medium together with shake data when shooting, comprising:
shake data reproducing means for reproducing the shake data of the image recorded on said recording medium;
shake trace data transformation means for outputting shake transmitting functions in accordance with the shake data reproduced by said shake data reproducing means;
first Fourier transformation means for carrying out a Fourier transformation on said shake transmitting functions output by said shake trace data transformation means;
image transformation means for transforming said image recorded on said recording medium into digital signals;
second Fourier transformation means for carrying out a Fourier transformation on said digital signals transformed by said image transformation means;
dividing means for carrying out divisions on outputs from said first and second Fourier transformation means; and
inverse Fourier transformation means for carrying out an inverse Fourier transformation on an output from said dividing means, an output from said inverse Fourier transformation means being an image of the scene free from any trace of the shake.

7. A shake data recording apparatus comprising:
an image pick-up device for shooting a scene by way of an optical system and recording an image of the scene on a recording medium;
shake quantity detecting means for detecting a shake quantity of the image pick-up device during the shooting and recording operation of said image pick-up device;
data storage means for storing data representing the frequency of the shake quantity during said recording operation on the basis of the shake quantity detected by said shake quantity detecting means; and
shake data recording means for recording said data representing the frequency of the shake quantity and stored in said storage means on said medium.

8. A shake data recording apparatus according to claim 7, wherein said shake data recording means comprises means for recording the data on a magnetic recording section formed on said recording medium by a magnetic head.

9. A shake data recording apparatus according to claim 7, wherein said shake quantity detecting means comprises means for detecting the frequency of a shake quantity along the X- and Y-axes of an orthogonal coordinate system, and said shake data recording means records the data representing the shake quantity along the X- and Y-axes of an orthogonal coordinate system as well as the frequency of the shake quantity.

10. A shake data recording apparatus according to claim 7, wherein said apparatus further comprises exposure duration detecting means for detecting a duration of exposure of said image pick-up device, and shake quantity storing means for storing the detected shake quantity with a sampling cycle determined by the exposure duration detected by said exposure duration detecting means.

11. A shake data recording apparatus according to claim 9, wherein said apparatus further comprises storage means for storing delay data concerning the timing of data detection by said shake quantity detecting means, said storage means stores the frequency of said shake quantity when a predetermined period of time according to said delay data has passed since the start of scene shooting.

12. A shake data recording apparatus disposed in an image pick-up device for shooting a scene by way of an optical system and recording an image of the scene on a recording medium, comprising:
shake quantity detecting means for detecting a shake quantity of the image pick-up device during the shooting and recording operation of said image pick-up device;
shake quantity storing means for storing data representing the shake quantity detected by said shake quantity detecting means with a sampling cycle determined according to an exposure duration;
storage means for storing shake trace data on the basis of data representing the shake quantity detected by said shake quantity detecting means; and
shake data recording means for recording said shake trace data on a recording medium.

13. A shake data recording apparatus according to claim 12, wherein said apparatus further comprises photometric means for detecting a brightness of said scene image, and exposure duration determining means for determining a duration of exposure on the basis of an output of said photometric means, said shake quantity storage means determining a sample cycle on the basis of an output of said exposure duration determining means.

14. A shake data recording apparatus disposed in an image pick-up device for shooting a scene by way of an optical system and recording an image of the scene on a recording medium, comprising:
shake detecting means for detecting a shake quantity of said image pick-up device;
storage means for storing delay data relating to the delay of an output of said shake detecting means;
arithmetic operation means for performing arithmetic operations to determine an image shake quantity on the basis of an output of said shake detecting means representing the shake quantity, and transmitted from said shake detecting means after an elapse of a period of time determined on the basis of the data representing the delay from the start of the scene shooting operation by said image pick-up device; and
recording means for recording data representing said image shake quantity determined by said arithmetic operation means on a recording medium.

15. A shake data recording apparatus according to claim 14, wherein said shake detecting means comprises one of an acceleration sensor and an angular velocity sensor.

16. A shake data recording apparatus according to claim 14, wherein said recording means comprises means for recording the data representing the image shake quantity on a magnetic recording section formed on said recording medium by a magnetic head.

17. A shake data recording apparatus according to claim 14, wherein said storage means comprises a non-volatile memory for allowing any data to be electrically written therein.

18. A shake data recording apparatus according to claim 17, wherein said apparatus further comprises means for detecting delay data for an individual apparatus when it is manufactured, and said non-volatile memory stores said delay data for the individual apparatus.

19. A shake quantity detecting apparatus disposed in an image pick-up device for shooting a scene by way of an optical system and recording an image of the scene on a recording medium, comprising:
   shake detecting means for detecting a shake quantity of said image pick-up device;
   storage means for storing delay data relating to a delay of an output of said shake detecting means; and
   arithmetic operation means for performing arithmetic operations to determine an image shake quantity during the operation of shooting a scene on the basis of the delay data stored in said storage means and the shake quantity detected by said shake detecting means.

20. A shake quantity detecting apparatus according to claim 19, wherein said arithmetic operation means comprises means for determining an image shake quantity on the basis of the shake quantity detected by said shake detecting means after an elapse of a time determined on the basis of the data representing the delay from the start of the scene shooting operation by said image pick-up device.

21. A shake quantity detecting apparatus according to claim 19, wherein said apparatus further comprises display means for displaying a warning signal whenever the image shake quantity determined by said arithmetic operation means exceeds a predetermined value.

22. A shake quantity detecting apparatus according to claim 19, wherein said apparatus further comprises recording means for recording said image shake quantity determined by said arithmetic operation means on a recording medium.

23. An image restoration apparatus for restoring an image record on a film together with shake data when shooting, comprising:
   shake data reading means for reading said shake data out of said film;
   shake data detecting means for detecting the direction and the quantity of the shake when shooting, in accordance with said shake data read out by said shake data reading means;
   image data reading means for controlling the direction of reading image data on said image on the basis of the direction of the shake detected by said shake data detecting means; and
   image restoration means for restoring a shake-free image by removing the effect of the shake from said image data on the basis of the image data read out by said image data reading means and the shake quantity detected by said shake data detecting means.

24. An image restoration apparatus according to claim 23, where said image data reading means comprises:
   a pixel array for receiving rays of light transmitted from an object image obtained by exposing said film by way of an imaging lens system;
   a sensor table for supporting said pixel array; and
   a rotary motion control means for rotating the sensor table on the basis of an output representing the shake direction and transmitted from said shake data detecting means.

25. A camera system, comprising:
   a recording medium having an image recording region and a data recording region;
   a camera main body for recording an object image on said recording medium; and
   an image reproducing device for reproducing the object image recorded on said recording medium,
   wherein said camera main body comprises:
      image recording means for recording the object image on said image recording region of said recording medium;
      shake detecting means for detecting a shake condition of said camera main body;
      data accumulating means for accumulating outputs of said shake detecting means during an image pick-up operation; and
      recording means for recording shake data on the basis of the shake condition accumulated in said data accumulating means on said data recording region of said recording medium, and
   said image reproducing device comprises:
      image storing means for reading the object image recorded on said image recording region of said recording medium and storing data representing the object image; and
      image reproducing means for reproducing a visible image from the data representing said object image and stored in said image storing means, said image reproducing means having means for correcting said data representing the object image on the basis of the shake data recorded on said data recording region of said recording medium, said image reproducing means thereby generating a substantially shake-free image.

26. A camera system according to claim 25, wherein said recording medium is a silver salt film and said data recording region is a magnetic recording section.

27. A camera system according to claim 26, wherein said camera main body further comprises a magnetic recording head for recording various data on said magnetic recording section.

28. A camera system according to claim 25, wherein said shake detecting means comprises means for periodically detecting the shake condition of the camera main body at least while it is being used for shooting a scene.

29. A camera system according to claim 25, wherein said shake detecting means comprises: shake detecting sensor capable of outputting a shake signal;
   a non-volatile memory means for storing in advance delay data representing a delay time of the shake signal from said shake detecting sensor; and
   correction means for correcting the shake signal from said shake detecting sensor on the basis of the delay data stored in said non-volatile memory means.

30. A camera capable of being loaded with a film provided with a magnetic recording section and having magnetic recording means for writing various data in said magnetic recording section, said camera comprising:

detection means for periodically detecting a shake condition of the camera and transmitting signals representing shake related data at least while the camera is being used for shooting a scene;

storage means for storing said shake related data; and control means for recording said shake related data stored in said storage means on said magnetic recording section by way of said magnetic recording means after the completion of a shooting operation; and wherein said detection means comprises:
    a shake detecting sensor capable of outputting a shake signal;
    a non-volatile memory for storing in advance delay data representing a delay time of the shake signal from said shake detecting sensor; and
    correction means for correcting shake signal from said shake detecting sensor on the basis of the delay data stored in said non-volatile memory.

31. A camera capable of being loaded with a film provided with a magnetic recording section and having magnetic recording means for writing various data in said magnetic recording section, said camera comprising:

detection means for periodically detecting a shake condition of the camera and transmitting signals representing shake related data at least while the camera is being used for shooting a scene;

storage means for storing said shake related data; and control means for recording said shake related data stored in said storage means on said magnetic recording section by way of said magnetic recording means after the completion of a shooting operation; and wherein said detection means comprises:
    exposure duration determining means for determining a duration of exposure of the camera; and
    cycle determining means for determining a detection cycle of the shake condition in accordance with of an output from said exposure duration determining means.

32. An image reproducing apparatus using a recording medium having an image recording section and a data recording section, said apparatus comprising:

image reading means for reading an object image recorded on said image recording section of said recording medium as image data;

data reading means for reading shake frequency data recorded in said data recording section of said recording medium at the time of a shooting operation; and image generating means for generating a substantially shake-free image from said image data and said shake frequency data.

33. An image reproducing apparatus using a silver salt film having an image recording section and a data recording section, said apparatus comprising:

image reading means for optically reading an object image recorded in said image recording section of said silver salt film as image data;

data reading means for reading shake frequency data recorded in said data recording section of said silver salt film at the time of a shooting operation; and image generating means for generating a substantially shake-free image from said image data read by said image reading means and said shake frequency data read by said data reading means.

34. An apparatus for restoring a substantially shake-free image of an object from a recording medium on which is recorded shake quantity data and shake direction data at the time of an image pick-up operation as well as object image data, said apparatus comprising:

means for reading said shake quantity data and said shake direction data from said recording medium;

means for establishing image restoration functions by using said shake quantity data read by said reading means;

means for reading said object image data from said recording medium on the basis of said shake direction data so as to coincide a data reading direction and a shake direction; and means for correcting an image by using said image restoration functions established by said establishing means and said object image data read by said reading means.

* * * * *

UNITED STATES PATENT AND TRADEMARK OFFICE
CERTIFICATE OF CORRECTION

PATENT NO. : 5,365,303
DATED : November 15, 1994
INVENTOR(S) : YAMASAKI et al

It is certified that error appears in the above-indentified patent and that said Letters Patent is hereby corrected as shown below:

Title page, Item [57] ABSTRACT, line 15, change "Image" (first occurrence), to -- An image--.

Signed and Sealed this

Twenty-seventh Day of February, 1996

Attest:

BRUCE LEHMAN

*Attesting Officer*   *Commissioner of Patents and Trademarks*